United States Patent
Ventura et al.

(10) Patent No.: US 12,013,548 B2
(45) Date of Patent: Jun. 18, 2024

(54) TUNABLE PRISM FOR OPTICAL IMAGE STABILIZATION

(71) Applicant: OPTOTUNE CONSUMER AG, Dietikon (CH)

(72) Inventors: Mark Ventura, Cham (CH); David Leuenberger, Zürich (CH); Michael Büeler, Vogelsang (CH); Manuel Aschwanden, Allenwinden (CH); Stephan Smolka, Zürich (CH); Frank Bose, Steinhausen (CH); David Niederer, Küttigen (CH)

(73) Assignee: NEXTLENS SWITZERLAND AG, Dietikon (CH)

( * ) Notice: Subject to any disclaimer, the term of this patent is extended or adjusted under 35 U.S.C. 154(b) by 0 days.

(21) Appl. No.: 16/770,596

(22) PCT Filed: Dec. 6, 2018

(86) PCT No.: PCT/EP2018/083831
§ 371 (c)(1),
(2) Date: Jun. 6, 2020

(87) PCT Pub. No.: WO2019/110743
PCT Pub. Date: Jun. 13, 2019

(65) Prior Publication Data
US 2021/0165238 A1    Jun. 3, 2021

(30) Foreign Application Priority Data

Dec. 6, 2017  (EP) ...................................... 17205771
Jun. 15, 2018  (EP) ...................................... 18178014

(51) Int. Cl.
*G02B 27/64*  (2006.01)
*G02B 5/06*   (2006.01)
*G02B 26/00*  (2006.01)

(52) U.S. Cl.
CPC ............. *G02B 27/646* (2013.01); *G02B 5/06* (2013.01); *G02B 26/004* (2013.01)

(58) Field of Classification Search
CPC ....... G02B 27/646; G02B 5/06; G02B 26/004
See application file for complete search history.

(56) References Cited

U.S. PATENT DOCUMENTS 5,315,435 A * 5/1994 Horiuchi .............. G02B 27/646
                                                      359/554
6,734,903 B1   5/2004 Takeda
(Continued)

FOREIGN PATENT DOCUMENTS

CN        1885066      12/2006
CN     204347347 U     5/2015
(Continued)

*Primary Examiner* — Darryl J Collins
*Assistant Examiner* — Matthew Y Lee
(74) *Attorney, Agent, or Firm* — JMB Davis Ben-David

(57) ABSTRACT

The invention relates Tunable prism (1) for optical image stabilization, comprising the components: —A container (2) that comprises a membrane (6) comprising at least a transparent portion, the container (2) further comprising a transparent rigid bottom portion (5) facing the membrane (6), wherein the membrane (6) is connected to the bottom portion (5), and wherein the container (2) encloses a volume (7) that is filled with a transparent fluid (3), —A transparent window (8) arranged on the membrane (6), wherein the membrane (6) comprises a deformable portion (6a) extending around an outer edge (8a) of the window (8), such that the window (8) can be tilted around a first and/or a second axis (201, 202) with respect to the bottom portion (5). The invention further relates to an imaging system (50) comprising the tunable prism (1).

17 Claims, 19 Drawing Sheets

(56) References Cited

U.S. PATENT DOCUMENTS

Figure 1A:
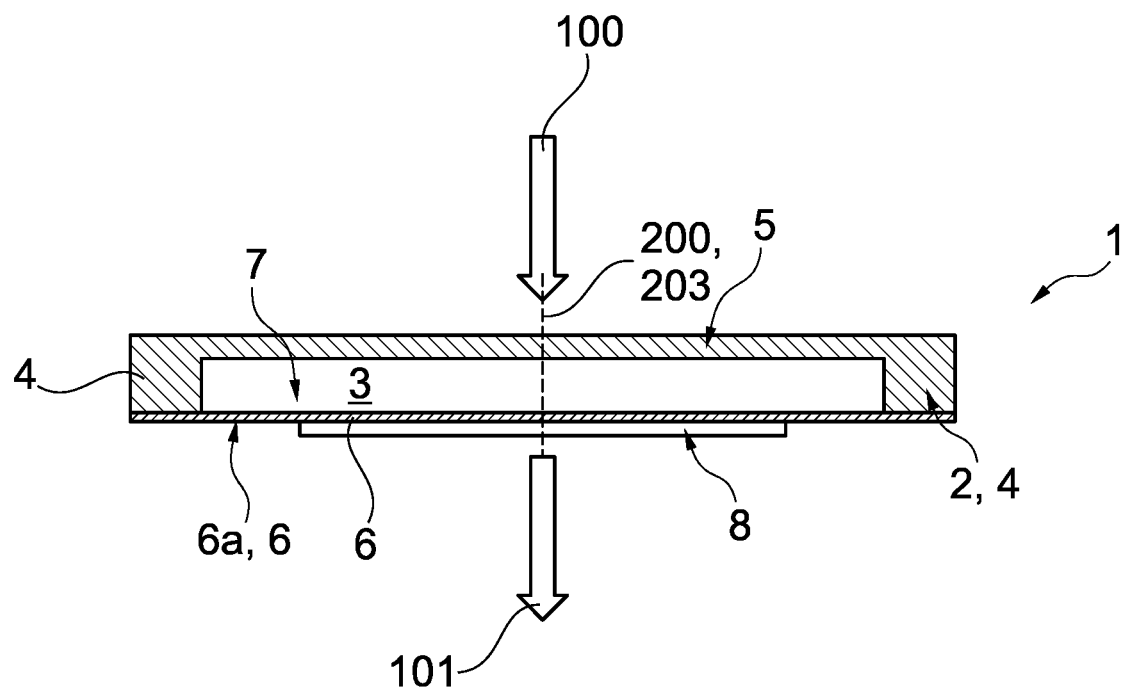

| | | | |
|---|---|---|---|
| 8,300,317 B2* | 10/2012 | Lee | G02B 3/14 |
| | | | 359/666 |
| 8,353,600 B1 | 1/2013 | Fu | |
| 2011/0158617 A1* | 6/2011 | Svardal | G03B 5/02 |
| | | | 396/55 |
| 2012/0081795 A1* | 4/2012 | Choi | G02B 3/14 |
| | | | 359/665 |
| 2016/0058312 A1 | 3/2016 | Han | |
| 2016/0259094 A1* | 9/2016 | Aschwanden | G02B 3/12 |
| 2017/0045649 A1* | 2/2017 | Bolis | G02B 26/004 |
| 2017/0322478 A1* | 11/2017 | Bolis | G02B 26/004 |

FOREIGN PATENT DOCUMENTS

| | | |
|---|---|---|
| CN | 104865621 | 8/2015 |
| CN | 105723251 | 6/2016 |
| CN | 105980888 | 9/2016 |
| JP | H0421815 | 1/1992 |
| JP | H11133210 | 5/1999 |
| JP | 2010518443 | 5/2010 |
| JP | 2014163963 | 9/2014 |
| JP | 2016535294 | 11/2016 |
| KR | 20120035386 | 4/2012 |
| KR | 20160068992 | 6/2016 |
| WO | 2015091836 | 6/2015 |
| WO | 2015108710 | 7/2015 |
| WO | 2016203029 | 12/2016 |
| WO | 2017149092 | 9/2017 |

\* cited by examiner (A) Neutral position    (B) Active position

TUNABLE PRISM FOR OPTICAL IMAGE STABILIZATION

CROSS-REFERENCE TO RELATED APPLICATIONS

This is the U.S. National Stage of International Patent Application No. PCT/EP2018/083831 filed on Dec. 6, 2018, which in turn claims the benefit of European Patent Application No. 17205771.3 filed on Dec. 6, 2017 and European Patent Application No. 18178014.9 filed on Jun. 15, 2018.

The invention relates to a tunable prism for optical image stabilization in imaging systems and an imaging system comprising the tunable prism.

In the state of the art optical image stabilization in optical imaging systems is well established.

For example, in hand-held cameras, found e.g. in mobile phones, a lateral or rotational motion of the camera, e.g. caused by shaking hands, would lead to a lateral shift of the image projected on the image sensor of the camera if no image stabilization would be employed.

Optical image stabilization refers to the method of compensating said shift or rotation or even to prevent such a lateral shift, by adjusting the imaging optics of the imaging system accordingly.

This can be facilitated by a tunable prism in the optical path of the imaging system. Once a lateral motion of the image sensor is detected, the tunable prism is adjusted such that incident light is deflected by the tunable prism in a way that the light hits the image sensor on the same location as would have hit the image sensor without motion.

This tuning of the prism needs to be comparably fast and also the movable portions of the prism should be preferably light in order to reduce the inertia and facilitate a short response time.

The enclosed volume of the container comprises a transparent liquid.

In order to facilitate a deflection of traversing light away from the optical axis of the tunable prism the top and/or the bottom portion can be tilted relatively to the optical axis, which yields the desired deflection. The optical axis particularly extends orthogonally and centrally through the bottom portion.

These bellows-based tunable prisms however need the wall member to be sealed to the bottom and the top portion. Therefore, two seals are required for the construction of such a tunable prism.

Therefore, the problem of leakage of the liquid filled in the volume has to be addressed twice.

Furthermore, the tunable prisms don't have a defined resting state that is assumed by the top and bottom portion when no actuation force is applied to the tunable prism.

An object of the present invention is to provide a tunable prism that requires only one seal, that provides stable and reliable operation and that can be manufactured with a particularly small geometric footprint, while the costs of manufacturing such a prism are comparably low.

The object is achieved by the prism having the features of claim 1.

Advantageous embodiments are described in the sub-claims

According to claim 1, the tunable prism for optical image stabilization comprises at least the components:

A container that comprises a membrane comprising at least a transparent portion, the container further comprising a transparent rigid bottom portion facing at least a part of the membrane, wherein the membrane is connected to, particularly in contact with and/or bonded with the bottom portion, and wherein the container encloses a volume that is filled with a transparent fluid, A transparent window arranged on and particularly connected or attached to the membrane, wherein the membrane comprises a deformable portion extending at least around an outer edge of the window, such that the window can be tilted around a first and/or a second axis with respect to the bottom portion.

The bonding of the membrane to the bottom portion is particularly achieved by naturally occurring adhesion forces. However it is also possible that bonding of the membrane and the bottom portion is achieved during a dedicated bonding step during manufacturing.

The term "deformable portion" particularly refers to a membrane portion that is elastically expandable and/or stretchable portion. However, it is noted that the membrane portion does not have to be elastic, but only deformable.

A tunable prism is particularly a device that is configured such that light can traverse the tunable prism from the bottom portion to the window, and wherein the light is deflected in an adjustable, i.e. tunable angle, or wherein the light is shifted with respect to an optical axis of the prism. In the latter case, the tunable prism can also be referred to as a beam displacer.

The tunable prism is configured for optical image stabilization, particularly in imaging systems such as cameras. Therefore, the tunable prism is configured to shift and/or tilt incident light rays such that an image on an image sensor remains at the same location or that motions of the image on the image sensor can be reduced or prevented.

The container is particularly configured to store a liquid or a gas in the volume. For this reason the container is particularly fluid-tight, i.e. gas-tight and/or impermeable to a liquid.

Consequently, the membrane is particularly non-permeable to the fluid that is comprised in the volume.

If the fluid is air, the membrane does not have to be impermeable to air. If the fluid is a liquid, the membrane is impermeable to the liquid.

The membrane is transparent at least within a clear aperture of the prism, particularly within a portion of the membrane that is arranged opposite the bottom portion.

The rigid bottom portion has particularly two sides that are planar particularly at least within an area of the bottom portion that is within a clear aperture of the tunable prism. One side of the bottom portion faces towards the volume of the container, and another side faces in the opposite direction.

In case the fluid has the same refractive index as the bottom portion the side of the bottom portion facing towards the volume does not need to be planar.

Therefore, an embodiment is perceivable, where fluid in the volume of the tunable prism has essentially the same refractive index as the bottom portion.

The planar, rigid bottom portion is particularly not altering the curvature of light waves traversing the bottom portion such that any image distortion due to focusing or defocusing effects of the bottom portion is prevented.

The same holds true for the window that is particularly extending parallel to the bottom portion, when no actuation forces are applied to it.

The window is particularly arranged outside the container volume on the membrane. Furthermore, the window covers an extended area of the membrane, while the deformable, particularly elastically expandable or stretchable portion of the membrane is left uncovered by the window.

It is noted that the membrane portion that is covered by the window can be deformable, particularly elastically expandable as well. The window is arranged such on the membrane that it is tiltable around at least the first axis, i.e. the window is partially rotatable around at least the first axis. Furthermore, when an actuation force is applied to the window, it is possible that not only a tilting motion is achieved, but also a motion with a translational or lateral component, particularly along or orthogonal to the optical axis of the tunable prism.

The window particularly rotates about at least one a pivot point which is located at the intersection of the optical axis and the outer (i.e. facing outwards the container) surface of the window.

It is explicitly noted that the window can be configured to undergo also a translational or lateral motion.

However, in case the fluid is incompressible, e.g. if the fluid is an incompressible liquid, a motion along the optical axis can be prevented to great extent.

Depending on the degrees of freedom of rotation, the window can also be configured to be tiltable around the first and the second axis, namely around two independent axes. This configuration allows deflecting traversing light two-dimensionally. An accidental translational motion component of the window is not affecting the deflection properties of the tunable prism. It sis however noted that with an ideal pivot point at the intersection of the optical axis and the outer surface of the window no translational motion will occur.

The window is particularly arranged such on the membrane that it can be moved and/or tilted towards or away from the bottom portion, wherein, if the window is tilted or moved, the elastically expandable membrane portion is stretched by the actuation of the window. When no actuation force is applied to the window, the membrane relaxes back in its original state, where the window is particularly aligned parallel to the bottom portion.

An actuation force can be a pushing, a pulling or a rotational force on the window. For this reason, the window can be attached to the membrane such that pull forces can be applied to the membrane, without the window being separated from the membrane, but that the membrane is pulled together with the window.

The window is particularly planar. Then, the curvature of light traversing the window remains unaltered such that any image distortion due to focusing or defocusing effects of the window is prevented.

The window extends particularly along two dimensions, for example along the x- and y-axis. The extension along the third dimension, here along the optical axis or z-axis of the tunable prism—is comparably small with respect to the extension along the x- and y-axis but can be relevant in case the prism is used as a beam displacer and the volume is filled with gas.

The first axis can be the x-axis and the second axis can be the y-axis. Therefore, in case the window undergoes a translational or lateral motion the first and/or the second axis undergo particularly the same motion.

In the following, also embodiments are disclosed that prevent a translational motion of the window with respect to the bottom portion.

The working mechanism of the tunable prism according to the invention can be summarized particularly with the following steps:

Apply an actuation force to the window causing the window to tilt around at least one axis relative to the bottom portion of the tunable prism;

The membrane can even be wrinkly and extremely soft. The main function of the membrane is to potentially seal the liquid comprised in the container.

The tunable prism according to the invention can be built comparably compact and in many different shapes such that it can be applied in miniature imaging devices with little space, such as mobile phones.

According to another embodiment the deformable portion of the membrane is elastically expandable.

According to this embodiment the membrane is particularly an elastic membrane, wherein the term "elastic" refers to the property of the membrane to be repeatedly expandable or stretchable by applying a force to the membrane. In case the membrane is an elastic membrane, the membrane returns to its original state and shape, when the force seizes.

The membrane is for example a thin elastic layer, or a thin elastic cover, that covers the recess that is formed by the bottom portion and the wall member.

The membrane is particularly under lateral tension, such that the membrane returns to its particularly planar shape if no actuation force is applied to it.

The tilted window stretches at least the elastically expandable portion of the membrane, which causes the membrane to exert a restoring force to the window;

Once the actuation force seizes the restoring force of the membrane, that is particularly linear, brings the window and the membrane back to the resting state, i.e. particularly a parallel orientation with respect to the bottom portion.

The membrane is particularly configured to exert a restoring force to the window, the restoring force pointing in the opposite direction than an applied actuation force on the window.

According to another embodiment of the invention, the membrane is sealingly connected with the bottom portion.

According to another embodiment of the invention, the membrane completely encloses the container volume and wherein the bottom portion and the transparent window are arranged on a side of the membrane that faces outwards the enclosed container volume.

According to another embodiment of the invention, the membrane comprises two membrane members that are sealingly connected with each other and enclose the container volume.

According to another embodiment of the invention, the tunable prism further comprises a rigid wall member, wherein the bottom portion and the wall member are rigidly connected and the membrane is sealingly connected to the wall member, wherein the deformable, particularly elastically expandable portion of the membrane extends between the outer edge of the window and the wall member.

According to this embodiment the membrane is attached to the wall member such that the fluid cannot exit the volume. For this reason, the wall member particularly comprises a flat, circumferential top portion onto which the membrane can be glued or otherwise sealed in a circumferential manner.

According to another embodiment of the invention, the bottom portion and the wall member are integrally formed.

According to this embodiment, the bottom portion and the wall member consist of the same material and are produced in a single piece, i.e. they are not glued or connected in a separate processing step.

This embodiment reduces manufacturing costs, as the bottom portion and the wall member do not have to be assembled in a separate assembly step.

According to another embodiment of the invention, the bottom portion and/or the wall member comprise or consist of glass or a transparent polymer.

This embodiment provides particularly a transparent bottom portion wherein the materials used, namely glass or a transparent polymer are particularly affordable.

According to another embodiment of the invention, the wall member can consist of a non-transparent material such as steel, aluminium, plastic or a printed circuit board (PCB) material or compound.

According to another embodiment of the invention, the window comprises or consists of glass or a transparent polymer.

This embodiment provides a transparent window, wherein the materials used, namely glass or a transparent polymer are particularly affordable.

According to another embodiment of the invention, the elastically expandable or stretchable membrane portion extends circumferentially around the outer edge of the window between the wall member and the outer edge of the window.

According to this embodiment, the window is particularly arranged on the membrane without the window covering any part of the wall member. This arrangement allows that the window can be tilted around the first and second axis without its motion being hindered by an obstacle like the wall member.

According to another embodiment of the invention, the membrane is sealed to the wall member. Thus, the membrane can particularly be sealingly glued, welded or clamped to the wall member.

According to another embodiment of the invention, the membrane is elastically expandable or stretchable over the whole range covering the volume of the container.

This embodiment allows that the membrane consists of the same material throughout, which in turn translates into reduced manufacturing costs.

According to another embodiment of the invention, the first and/or the second axis extend parallel or along a plane of extent of the window, and particularly wherein the first and/or second axis are oriented orthogonally to each other.

The first axis and the second axis are particularly virtual axes.

According to another embodiment of the invention, the window is round, particularly elliptical or circular. This means, that the outer edge geometry of the window is following a round, particularly elliptical or circular contour. The window itself is a three-dimensional piece, wherein the window extends mainly along the first and the second axis and compared to the extent along the first and the second axis the window extends only marginally along a third independent axis, e.g. the optical axis.

A round glass window is particularly well-suited for tilting the window along the first and/or second axis, e.g. for two-dimensional tilting.

According to another embodiment of the invention, the wall member and particularly the membrane is round, particularly elliptical or circular, i.e. the wall member, particularly the inner contour of the wall member can have a similar shape than the window.

According to another embodiment of the invention, the window is rectangular with rounded corners.

The rectangular shape also comprises a square shape. Also here, the term rectangular with rounded corners refers to the outer edge geometry of the window.

A rectangular glass window with rounded corners is particularly well-suited for tilting around the first axis or the second axis, e.g. for one-dimensional tilting.

The rectangular window particularly helps to reduce size in the folded optics design, such as a tele- or zoom lenses, where plastic lenses are particularly D-cut and rectangular apertures are used to block light going beyond the image sensor.

According to another embodiment of the invention, the wall member and particularly the membrane is rectangular with rounded corners, i.e. the wall member, particularly the inner contour of the wall member facing the volume can have a similar shape than the window.

According to another embodiment of the invention, the wall member comprises at least on a side of the wall member that faces the volume a light-absorbing layer, or wherein the wall member consists of a light-absorbing compound.

The light absorbing layer can comprise a dark metal coating, or the wall member can be coloured in the absorbing colour.

A metal layer can facilitate improved bonding to printed circuit boards and other substrates forming or comprising the container.

The light absorbing layer eliminates stray light to great extent.

According to another embodiment of the invention, the tunable prism comprises a prism-shaping device, wherein the prism-shaping device is in contact with the window, wherein the prism-shaping device has a clear aperture that is particularly arranged centrally over the container, i.e. particularly arranged over a centre of the bottom portion, particularly centred around the optical axis of the tunable prism, wherein the prism-shaping device is configured to tilt the window around the first and/or second axis by conveying an actuation force on the window, particularly on at least one section of the window that is located outside or around the clear aperture.

The clear aperture does not have to be a free space or recess but can also be a transparent portion of the prism-shaping device.

The prism-shaping device is particularly arranged on top of the window, such that push and pull forces can be applied preferably on sections that are located outside the clear aperture, particularly to a region of the window close to the outer edge, such that a tilting of the window can be achieved by pushing or pulling on said section or region.

The prism-shaping device is attached to the window such that push and pull forces can be applied to the window. The push, pull and/or rotational forces are summarised under the term "actuation force".

The actuation force causes particularly a turning moment on the window.

The term "tilting" refers to the window being moved or rotated, such that it encloses an angle with the bottom portion.

Tilting the window particularly comprises a rotational motion of the window.

The prism-shaping device can comprise a rigid, particularly transparent polymer. The prism-shaping device itself is particularly not configured to generate an actuation force but to convey an actuation force to the window.

The prism-shaping device can comprise unconnected parts that are attached particularly on opposing sections of the window.

The unconnected parts can enclose the clear aperture of the prism-shaping device.

According to another embodiment of the invention, the prism-shaping device is transparent window, particularly a glass or polymer window. This embodiment maximizes the optically usable clear aperture as no shading would occur in the interface between the prism shaping device and the window of the container. As the prism-shaping device is particularly completely transparent, the clear aperture is comprised in the window of the prism-shaping device.

According to another embodiment of the invention, the prism-shaping device is in contact with or attached to two opposite sections of the window, wherein the two sections are located outside the clear aperture and wherein the prism-shaping device is configured to exert an actuating force on either section or on both sections.

This embodiment allows a symmetrical conveyance of an actuation force to the window and thus particularly allows for a more precise tilting motion of the window, particularly in case the window is not connected to a solid rotation axis, e.g. from a gimbal.

According to another embodiment of the invention, the prism-shaping device is configured to convey opposing actuation forces simultaneously on the two opposite sections, such that a turning moment can be applied to the window.

This embodiment allows a particularly symmetrical tilting around the first and/or second axis.

According to another embodiment of the invention, the prism-shaping device is in contact with the window along a circumferential section located outside the clear aperture, the circumferential section particularly comprises the two opposite sections.

This embodiment allows a particularly stable arrangement of the prism-shaping device, allowing the actuation force to be conveyed to a plurality of points that can be freely chosen, when designing the tunable prism.

According to another embodiment of the invention, the tunable prism comprises a rigid substrate, wherein the substrate comprises the container, or wherein the container is mounted on the substrate, or wherein the substrate comprises a receiving portion that is configured to mount the container, such that the container is rigidly connected to the substrate, i.e. it is not rotating nor shifting with the window.

The substrate can be a printed circuit board of an imaging device.

According to this embodiment the tunable prism can be simply mounted on a substrate, which allows a simplified manufacturing process for imaging devices.

When the container is mounted or integrally formed with the substrate the windows is tiltable with respect to the substrate.

The substrate can comprise optical elements for imaging, such as lenses or an image sensor. The substrate can also comprise actuation means for the window of the tunable prism.

According to another embodiment of the invention, the prism-shaping device or the window is connected to at least one actuation means that is configured to generate an actuation force for tilting the window around the first and/or the second axis, and to apply said actuation force to the prism-shaping device or the window for tilting the window.

The actuation means can be a motor device, such as a bi-directional motor, or a device that is capable to generate an actuation force, e.g. a piezo element, particularly bi-directionally. The actuation means can be furthermore configured to convey the actuation force directly to the window or to the prism-shaping device.

Furthermore, the actuation means can for example comprise a reluctance motor such as an electro-permanent-magnet motor or other motor concepts.

The actuation means has to be rigidly attached to the container or the substrate with at least one portion. The other portion should be movable in order to allow the transmission of an actuation force to the window or the prism-shaping device.

The actuation means can be configured to generate a rotating or tilting motion or to generate and translational motion with one of its portions.

The actuation means can also be configured to generate a mixture of translational and rotational motions.

The actuation means has to be connected in such way to the window or the prism-shaping device that a generated motion of the actuation means is translated such that the window executes a tilting motion, i.e. experiences a turning moment.

According to another embodiment of the invention, the tunable prism comprises at least one actuation means for each axis of rotation of the window. Therefore, if the tunable prism is configured to tilt the window around the first axis, the tunable prism particularly comprises one actuation means.

If the tunable prism is configured to tilt the window around the first and the second axis independently, the tunable prism according to this embodiment comprises at least two actuation means, each actuation means configured and connected such to the window, the prims shaping device or a movable part, that the window can be tilted around the respective axis by the actuation force generated by the actuation means.

According to another embodiment of the invention, the tunable prism comprises two actuation means for each axis of rotation of the window. Therefore, if the tunable prism is configured to tilt the window around the first axis only, the tunable prism particularly comprises two actuation means that are particularly arranged opposite of each other particularly along the same axis of rotation.

If the tunable prism is configured to tilt the window around the first and the second axis independently, the tunable prism according to this embodiment comprises four actuation means, wherein the four actuation means are particularly arranged pairwise opposite of each other, each pair of actuation means being configured and connected such to the window, the prims shaping device or the movable part, that the window can be tilted around the respective axis by the actuation forces generated by the respective pairs of actuation means.

The term "pairwise opposite of each other" refers particularly to an arrangement of the respective components, particularly the actuation means, where the pair is arranged diagonally of each other along an axis of rotation.

However, in some embodiments the term "pairwise opposite of each other" can also refer to an arrangement of the components, where the pairs of the components are for example arranged adjacent to each other and parallel to an axis of rotation.

According to another embodiment of the invention, the prism-shaping device is connected to a movable part that connects the actuation means and the prism-shaping device.

The movable part can comprise an arm or an extension of the prism-shaping device.

The movable part can be configured to translate for example the translational motion of the actuation means in a tilting motion for the window.

In case the tunable prism has a plurality of actuation means, each actuation means can be connected to a movable part.

The movable part is also referred to a "mover" in the specification.

According to another embodiment of the invention, the movable part comprises a joint that connects the prism-shaping device with the movable part.

This embodiment allows for a better translation of for example a translational motion provided by the actuation means into a tilting motion of the window or of the prism-shaping device.

The movable part is particularly arranged essentially orthogonal to the first and/or the second axis and thus, the window and particularly the prism-shaping device.

The joint can for example be a glue spot, a mechanical joint or a spring-like joint particularly made from a spring steel.

According to another embodiment of the invention, the at least one actuation means comprises or is a voice coil actuator, the voice coil actuator comprising a magnetic portion and a voice coil portion.

The voice coil actuator comprises for example a voice coil motor. The magnetic portion comprises or consists for example of a permanent magnet.

The voice coil portion comprises or consists for example of a voice coil.

The voice coil portion is arranged such with respect to the magnetic portion that when an electric current is applied to the voice coil portion, an actuation force is generated. This actuation force can be a rotational force and/or a translational force that moves the voice coil portion with respect to the magnetic portion in an adjustable direction.

The voice coil actuator therefore comprises two portions that are arranged movably with respect to each other, wherein a first part comprises the magnetic portion and the other part comprises the voice coil portion.

A voice coil actuator is a robust and comparably cost-effective actuation means. A voice coil actuator is particularly cheaper than a piezo actuator.

According to another embodiment of the invention, the voice coil actuator is configured to move the voice coil portion relatively to the magnetic portion upon provision of an electric current to the voice coil portion in at least a partially translational manner, so that particularly the movable part experiences a partially translational actuation force along the z-axis of the tunable prism or wherein the prism-shaping device experiences a partially rotational actuation force, wherein particularly
  the voice coil portion is connected to the prism-shaping device or the movable part, particularly wherein the magnetic portion is arranged on a portion that is not moving with respect to the window, e.g. on the substrate or the container, or
  the magnetic portion is connected to the prism-shaping device or the movable part, particularly wherein the voice coil portion is arranged for example on the substrate or the container.

In case the tunable prism comprises a mover with a joint, the voice coil actuator can be configured for a purely translational motion. While the translational motion of the voice coil actuator moves the mover in translationally, the joint between the mover and the prism-shaping device translates this translational motion into a tilting motion of the prism-shaping device and thus the window.

In case the voice coil portion is arranged on the mover or the prism-shaping device, the voice coil portion has to be electrically connected.

The electrical connector facilitating the electrical connection can be configured as a stabilisation spring for the voice coil actuator.

The tunable prism particularly comprises a first pair of voice coil actuators for tilting the window around the first axis and the second pair of voice coil actuators for tilting the window around the second axis. The pairs of voice coil actuators being particularly arranged pairwise opposite of each other.

According to a variant of the invention, the voice coil portion or the magnetic portion is rigidly connected to the window or to the prism-shaping device and with the respective other portion of the voice coil actuator to the substrate or to the container, and wherein the voice coil actuator is configured to rotate the voice coil portion with respect to the magnetic portion such that the window tilts around the first or the second axis.

The tunable prism particularly comprises at least a pair of voice coil actuators for tilting the window around the first axis and a second pair of actuators for tilting the window around the second axis. The tilting of the window around the first and second axis is particularly independent of each other. The voice coil actuators are particularly arranged pairwise opposite of each other.

According to another embodiment of the invention, the tunable prism comprises four actuation means that are connected to the window, the prism-shaping device, or the movable part, in such a way that the window is tiltable around the first and second axis with respect to the bottom portion, when at least one of the four actuation means is actuated.

In this configuration, the four actuation means are a particularly arranged pairwise, for example a first pair comprising a first and a second actuation means for tilting the window around the first axis and a second pair comprising a third and a fourth actuation means for tilting the window around the second axis.

The actuation means of the first and the second pair are arranged particularly opposite of each other.

This embodiment particularly facilitates a comparably stable and robust tilting of the window around the first and/or second axis.

According to another embodiment of the invention, the at least one actuation means comprises or is a shape memory alloy (SMA) component, wherein the shape memory alloy component is connected to the prism-shaping device, particularly wherein the shape memory alloy component is connected to the prism-shaping device with a joint.

The shape memory alloy component is particularly a wire or a rod consisting of the shape memory alloy.

The shape memory alloy component change its shape, for example its shrinks along at least one dimension, upon provision of an electric voltage.

The shape memory alloy component is a robust actuation means, particularly consisting of only one component According to another embodiment of the invention, the tunable prism comprises a gimbal, wherein the window, the prism-shaping device or the movable part is connected to the gimbal such that the window can be tilted around the first and/or the second axis with respect to the container.

The gimbal provides a stable and fixed axis of rotation to the window or the prism-shaping device, such that a tilting of the window can be performed more accurately.

The gimbal particularly prevents translational or lateral motion of the window with respect to the bottom portion.

The gimbal is particularly connected with a non-moving part of the gimbal to the container or to the substrate of the tunable prism and with the movable part of the gimbal it is connected with the window or the prism-shaping device or the mover.

The gimbal facilitates particularly the use of only one actuation means per tilt axis of the window.

According to another embodiment of the invention, the gimbal is a one or a two-axis gimbal such that the window can be tilted around the first and/or the second axis with respect to the bottom portion.

According to another embodiment of the invention, the substrate comprises four side wall sections connected to each other to form a circumferential side wall, wherein each two adjacent side wall sections meet and form a corner region on an inside of the circumferential side walls, such that the substrate comprises four corner regions.

The substrate can have a square geometry.

According to another embodiment of the invention, the tunable prism comprises four voice coil actuators, wherein the four magnetic portions of the four voice coil actuators are attached to the substrate in one of the four corner regions each, wherein the four corresponding voice coil portions are arranged on the movable part of the prism-shaping device, wherein the voice coil portions are arranged opposite the magnetic portions particularly on a side of the circumferential side walls that faces the container.

This embodiment allows a particularly compact built of a gimbal-free tunable prism, for example with a square shaped substrate and a round window and membrane.

Alternatively, the tunable prism comprises four voice coil actuators, wherein the four magnetic portions of the four voice coil actuators are each attached to a side of one of the four side wall sections that faces the container, such that the magnetic portions are arranged pairwise opposite of each other, wherein the four corresponding voice coil portions are arranged on the movable part or the prism-shaping device, particularly wherein the voice coil portions are arranged opposite the magnetic portions on the inside of the circumferential side walls.

This embodiment too, allows a particularly compact built of a gimbal-free tunable prism, for example with a square shaped substrate and a round window and membrane, wherein the magnetic portions are arranged on the side walls rather than in the corner regions of the substrate.

According to another embodiment of the invention, the tunable prism comprises a driver circuit configured to control electric currents and particularly voltages applied to the at least one actuation means.

The driver circuit can be arranged or comprised by the substrate. The driver circuit is in electrical contact with the at least one actuation means.

The tunable prism with a driver circuit on the substrate can be built comparably compact.

According to another embodiment of the invention, the tunable prism comprises four actuation means, wherein the driver circuit comprises four channels, each channel configured to provide the electric current to one of the four actuation means particularly independently of each other.

A channel is an independently addressable electric connection, i.e. each channel can provide a different electric current to the actuation means to which it is connected to.

This embodiment allows for greatest driving flexibility of the four actuation means.

According to another embodiment of the invention, the tunable prism comprises four actuation means, particularly four voice coil actuators that are arranged pairwise opposite of each other, wherein the driver circuit comprises particularly only a first and a second channel, wherein each channel is configured to provide an electric current of the same magnitude but with opposing signs to the actuation means that are arranged pairwise opposite of each other.

This embodiment allows for a controlling the tunable prism with a driver providing only two channels.

The inversion of the current polarity can be achieved with a polarity inverter device.

Opposing forces can also be achieved with opposing coil winding directions of the connected opposing coils.

The embodiment takes advantage of a particularly symmetric layout of the tunable prism and particularly the pairwise opposite arranged actuation means.

When the controller provides a signal to one of the actuation means to move e.g. along the z-axis, the corresponding, opposite arranged actuation means, is actuated in the opposite direction of the z-axis, which leads to a tilting motion of the window.

According to another embodiment of the invention, the tunable prism comprises four voice coil actuators, wherein the driver circuit comprises particularly only a first and a second channel, wherein each voice coil portion comprises a double coil, wherein each channel is configured to provide the same electric current to the voice coil portions that are arranged opposite of each other, wherein each channel is connected such to the voice coil portion that the generated forces of the two opposite voice coil portions point in opposite directions, when the electric current is provided.

This embodiment allows for controlling the tunable prism with a driver comprising only two channels, wherein the voice coil actuators, and particularly the voice coil portions are configured such they can be connected to the respective channel such that they perform motions in the opposite direction when the same current (in terms of magnitude and sign) is applied to the voice coil portion. This is particularly achieved by a double coil comprised in the respective voice coil portion.

The problem according to the invention is furthermore solved by an imaging system comprising a tunable prism according to the invention.

The imaging system comprises an image sensor and an imaging optics configured to focus or image an image on the image sensor, wherein the tunable prism is arranged at the imaging optics, particularly in front of the imaging optics and arranged such that an angle of incident light can be altered by tilting the window of the tunable prism.

The term "in front of the imaging optics" refers to the side of the imaging optics that is exposed to the side of the imaging system where light is incident. Therefore according to this embodiment, the tunable prism is particularly a front-most optical element of the imaging system.

It is noted that that the least image distortion is achieved if the prism is placed as close as possible to the aperture stop of the imaging system.

The imaging system can be a camera particularly comprised in a mobile phone.

In the following, the invention is detailed in terms of exemplary embodiments and figure descriptions. Note that the figures are not to scale.

It is shown in

Figure 2:
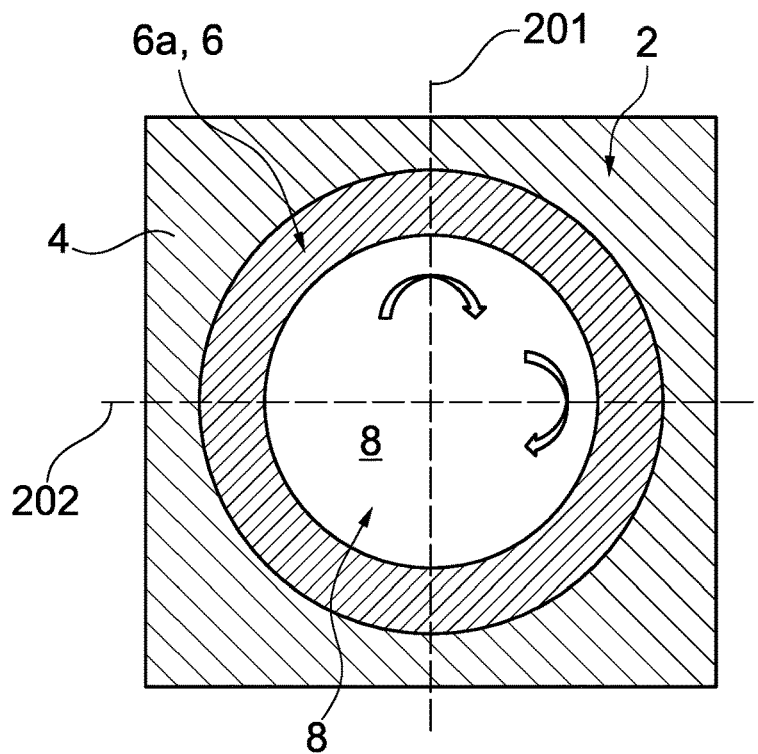
Figure 3:
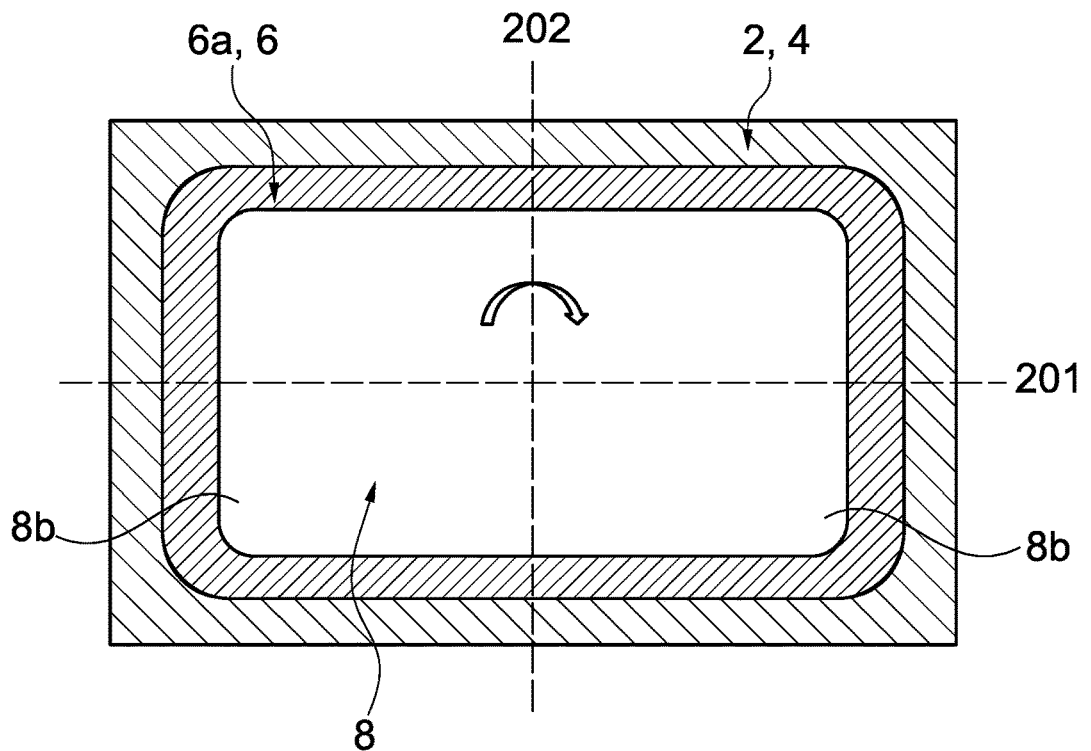
Figure 4:
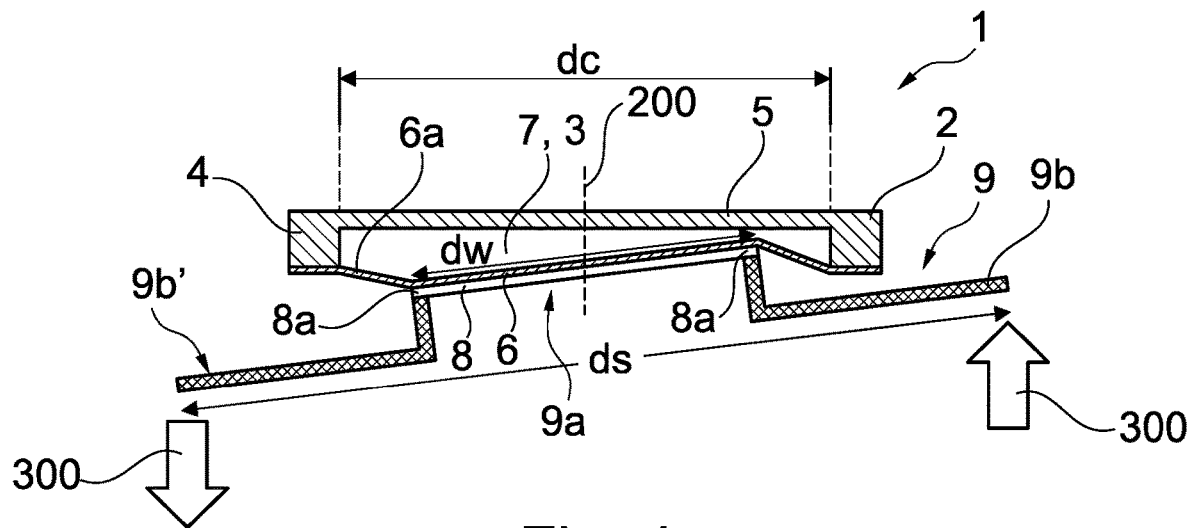
Figure 5:
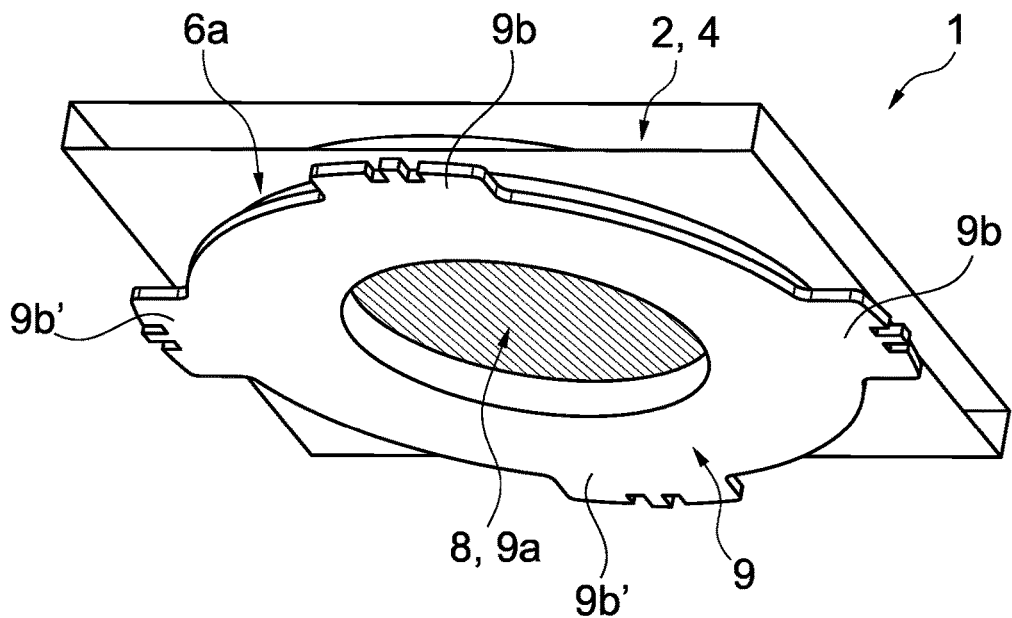
Figure 6:
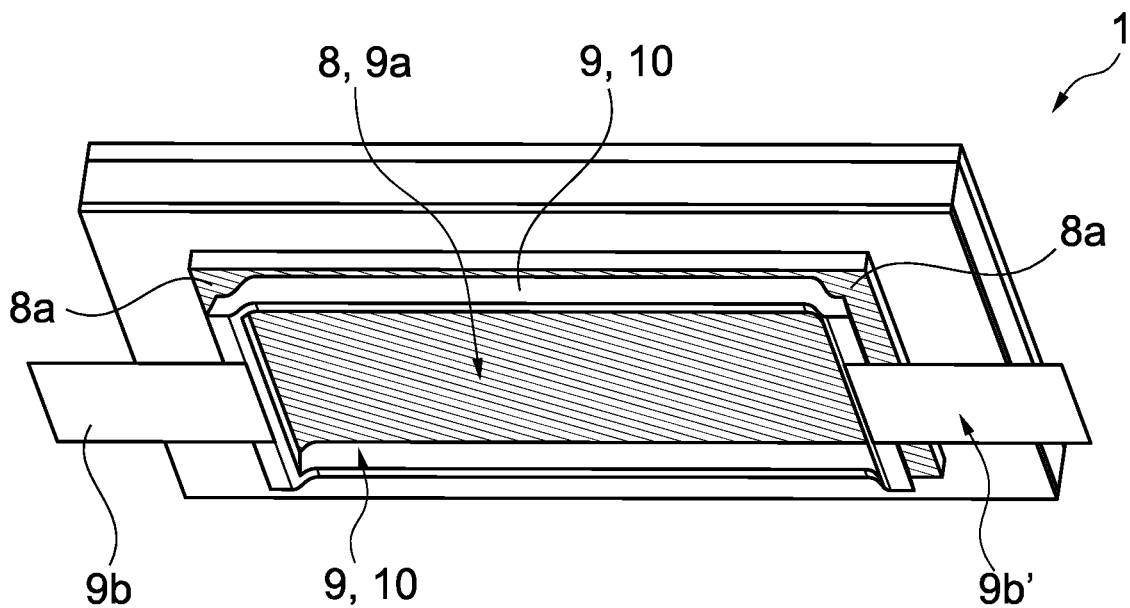
Figure 7:
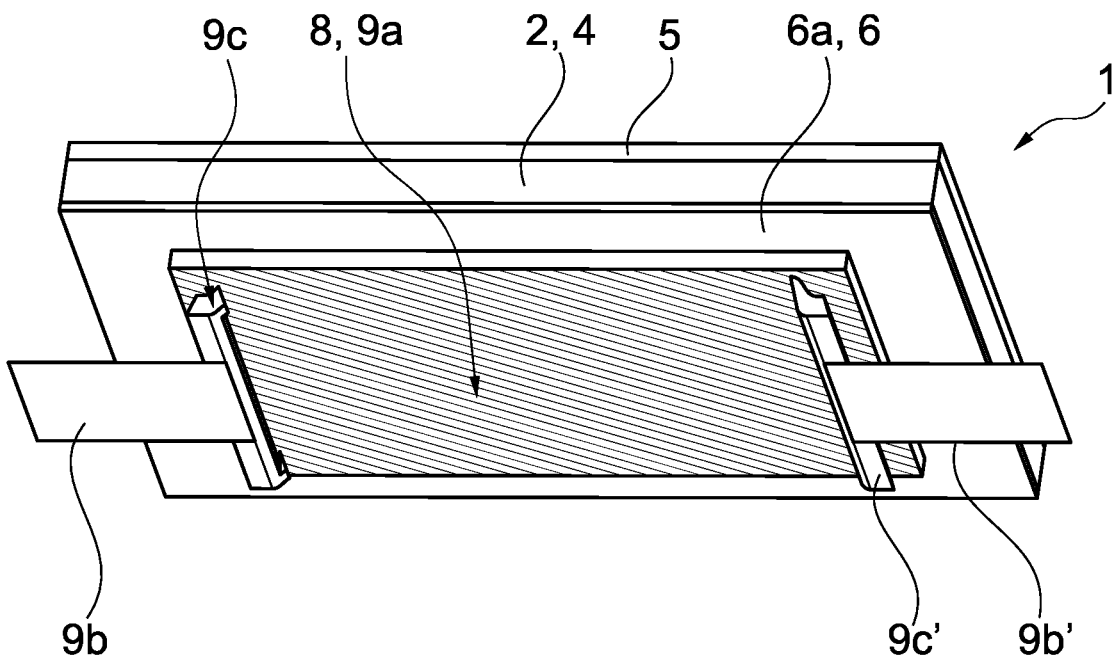
Figure 8:
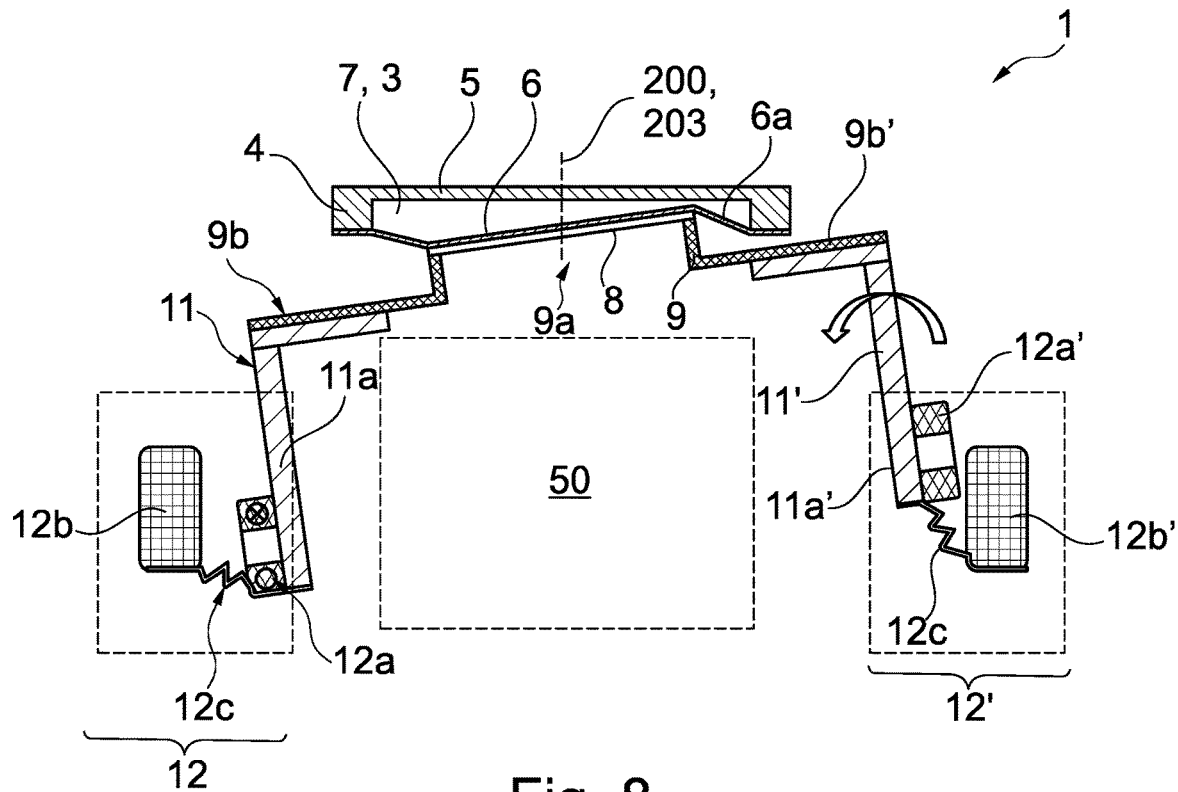
Figure 9:
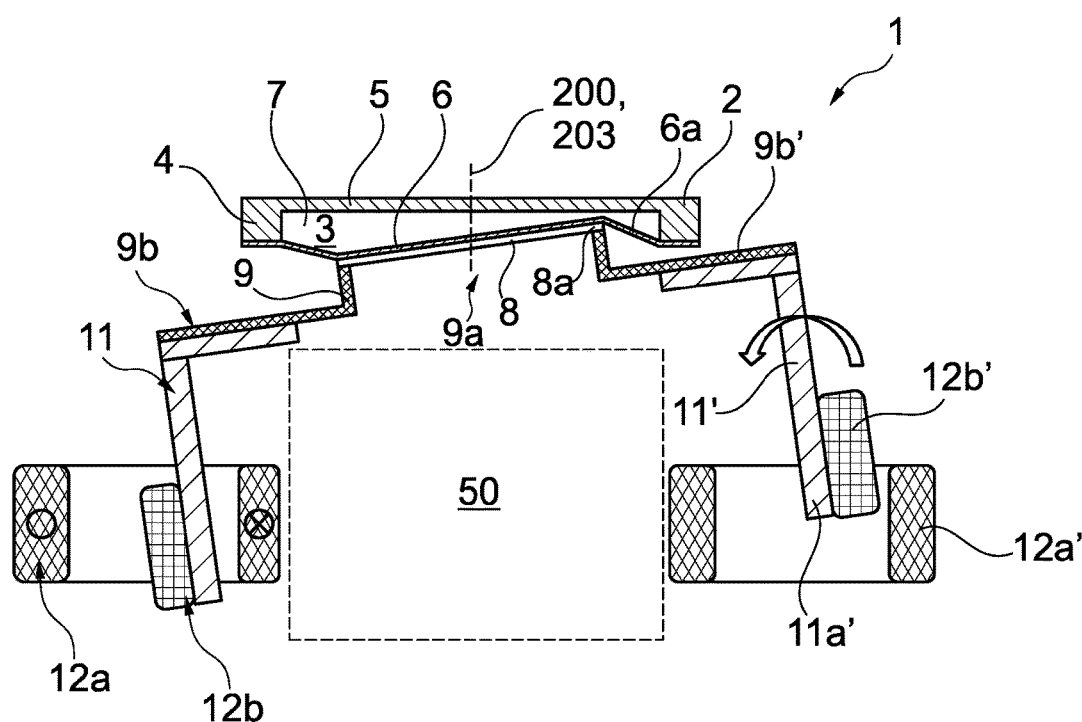
Figure 10:
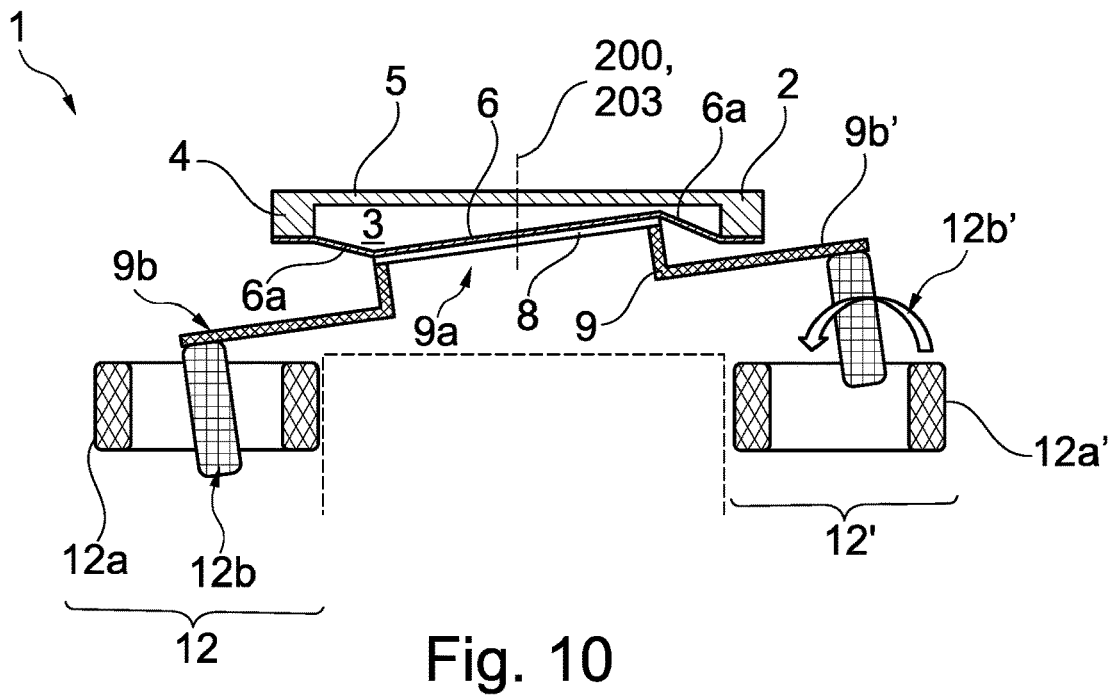
Figure 11:
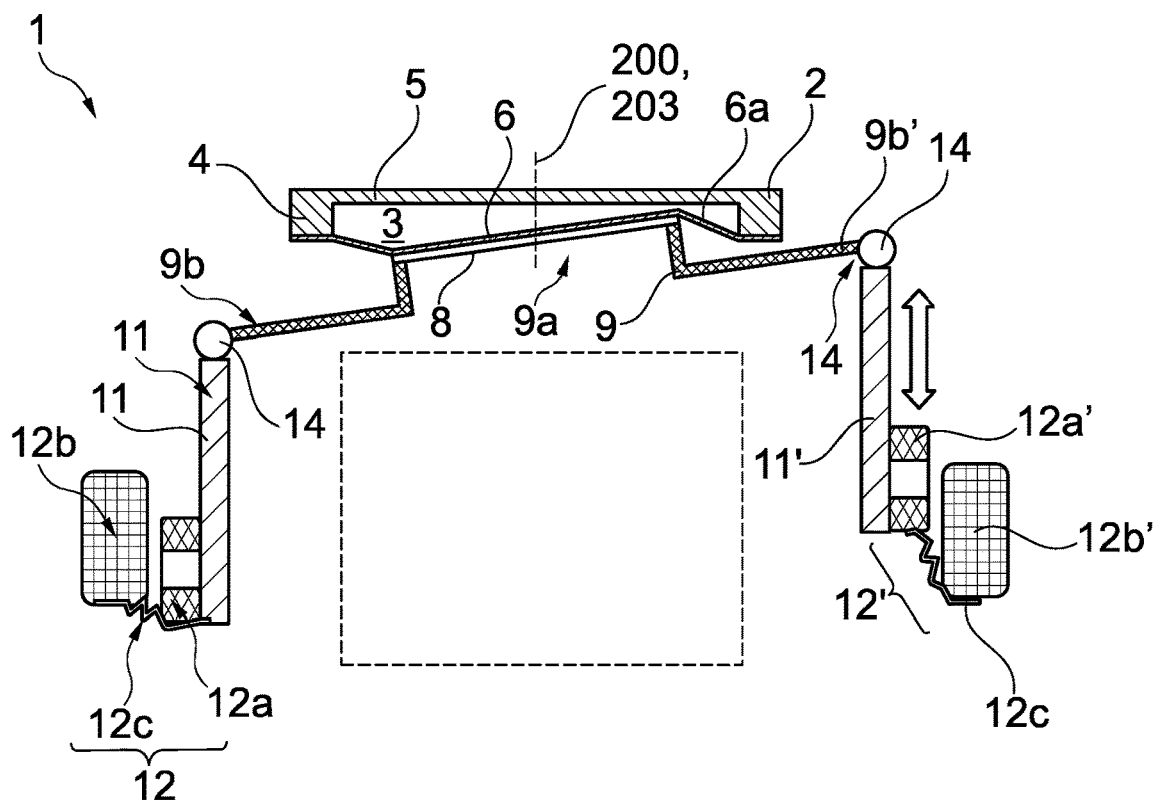
Figure 12:
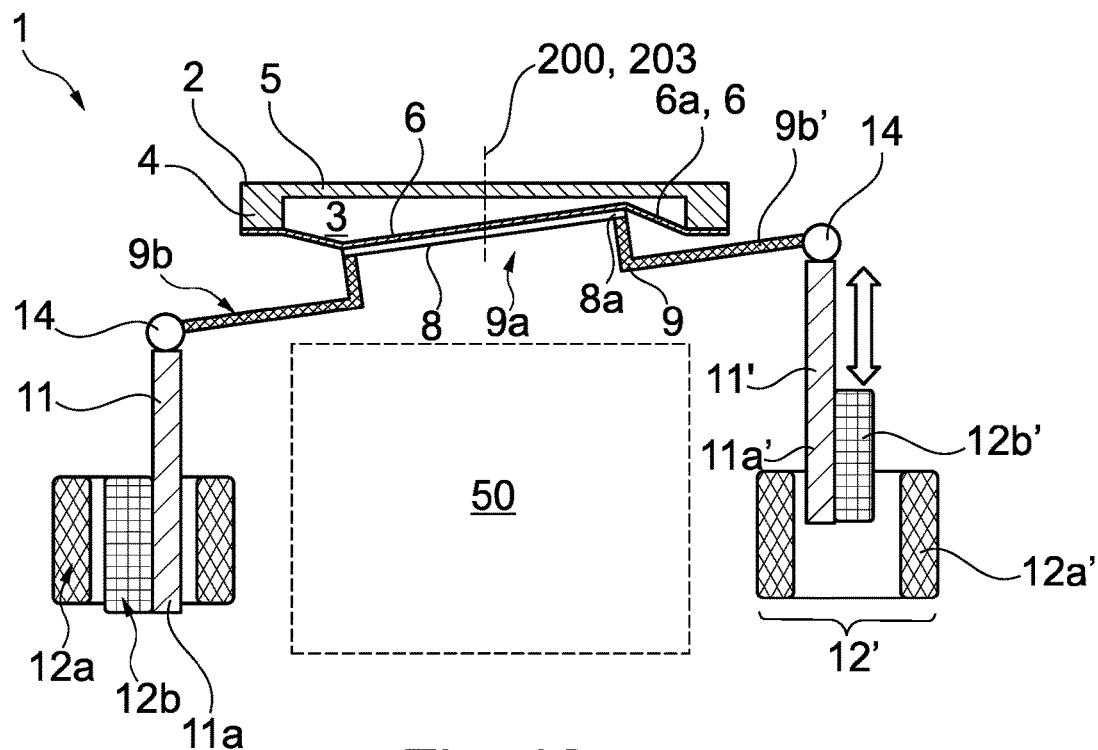
Figure 13:
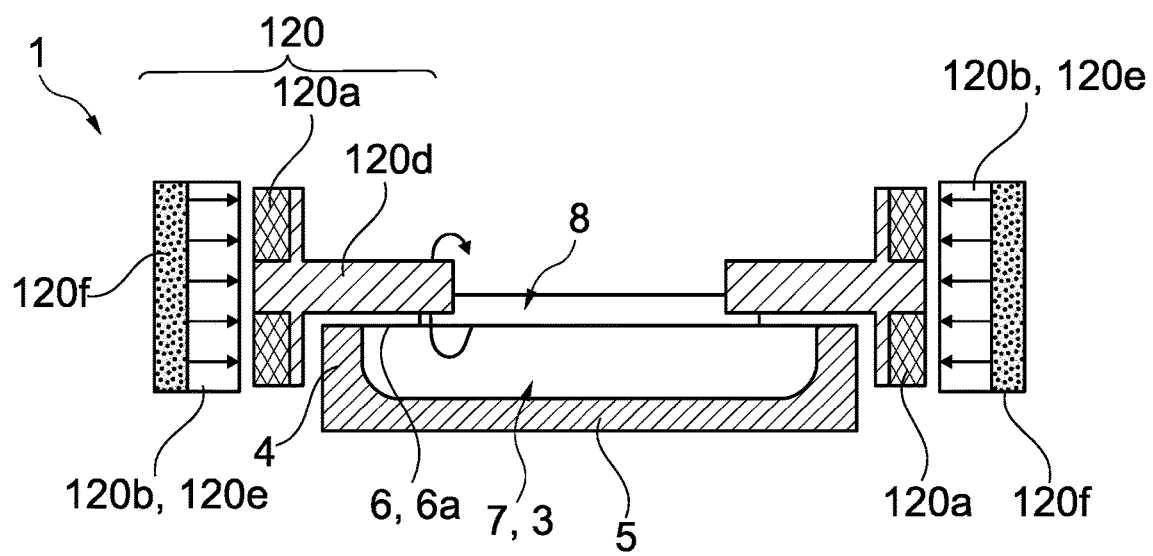
Figure 14:
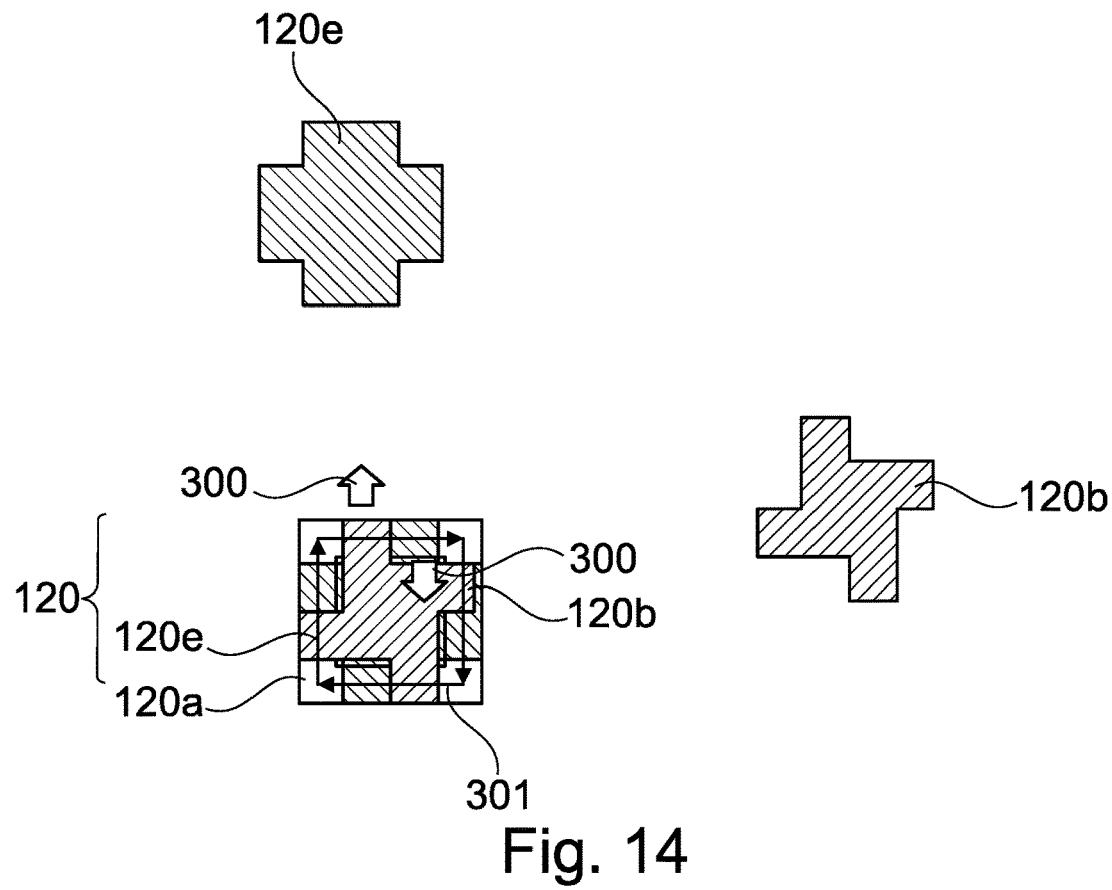
Figure 15:
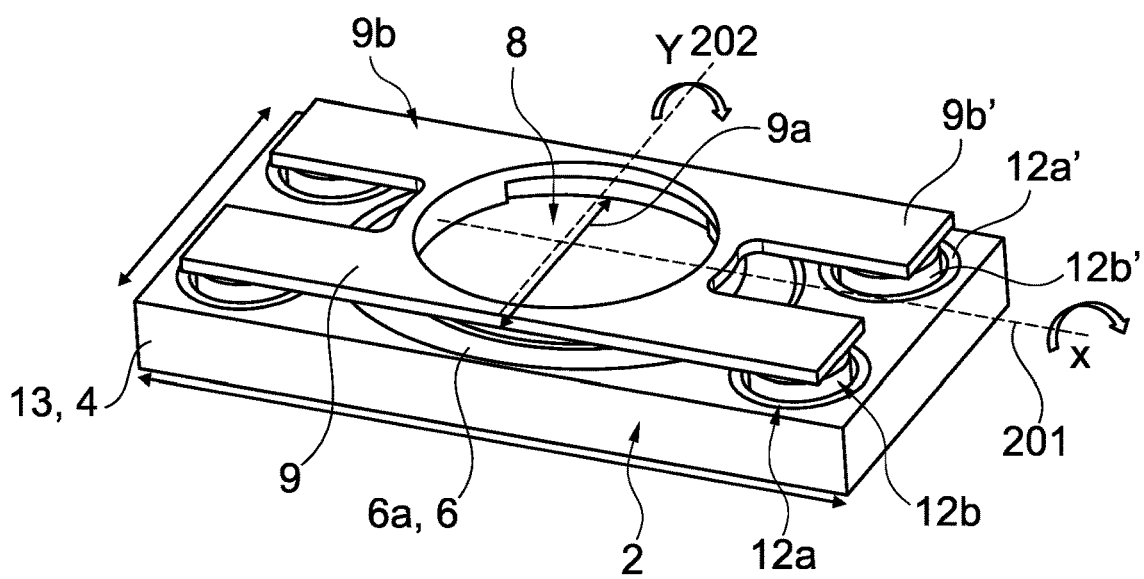
Figure 17:
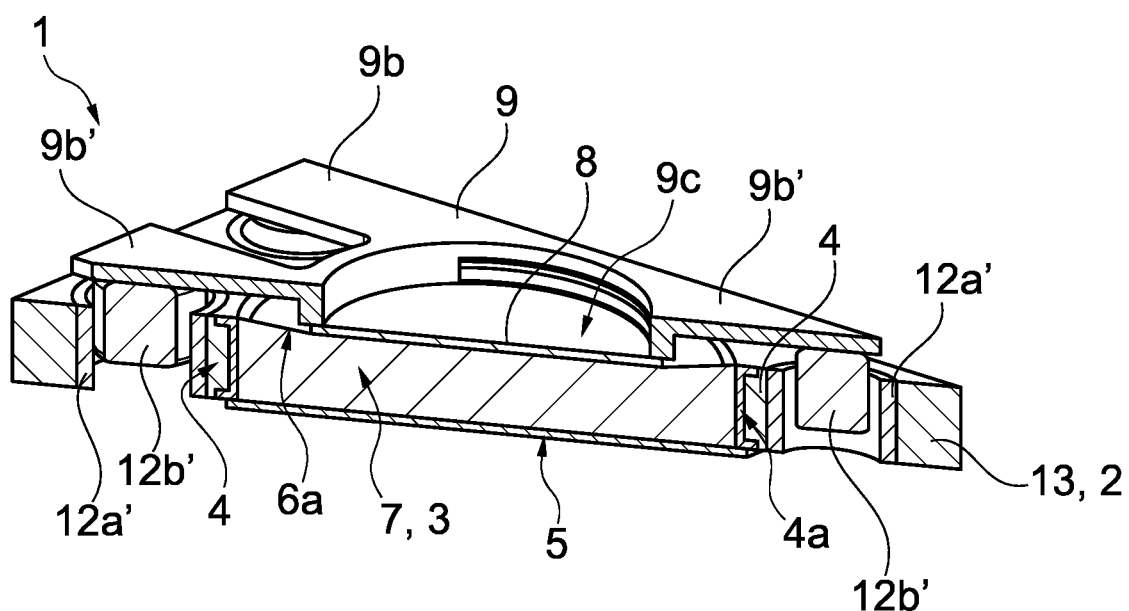
Figure 18:
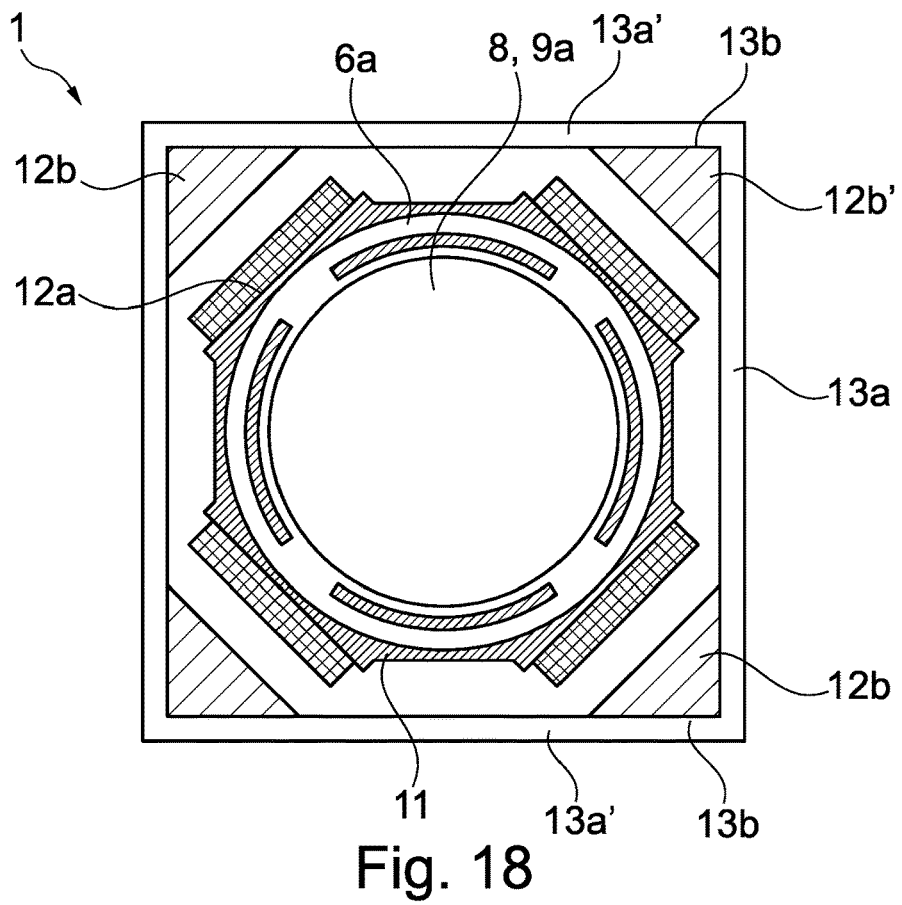
Figure 19:
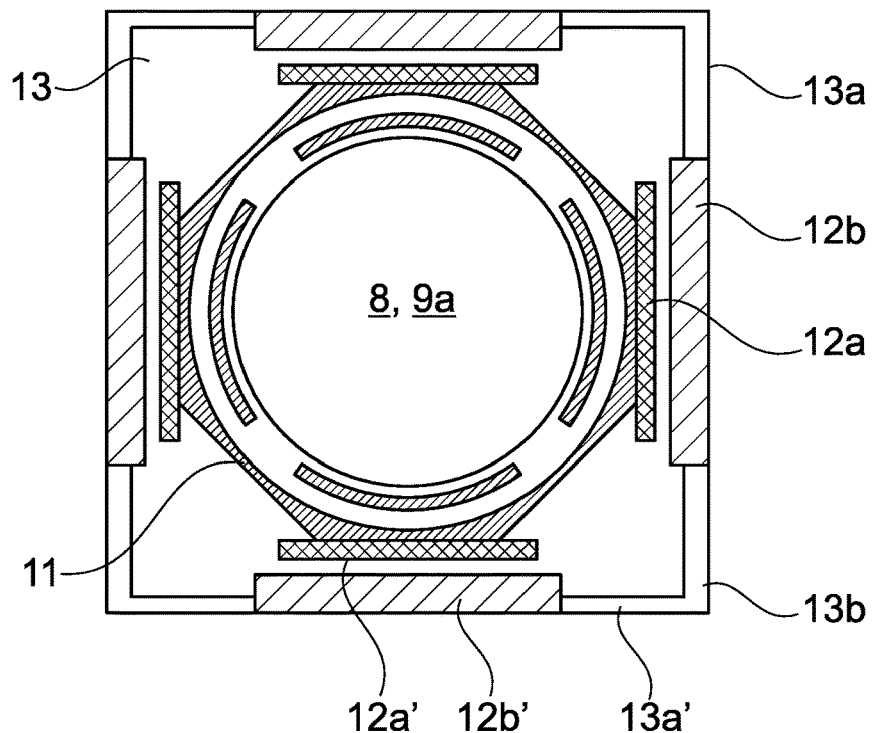
Figure 20:
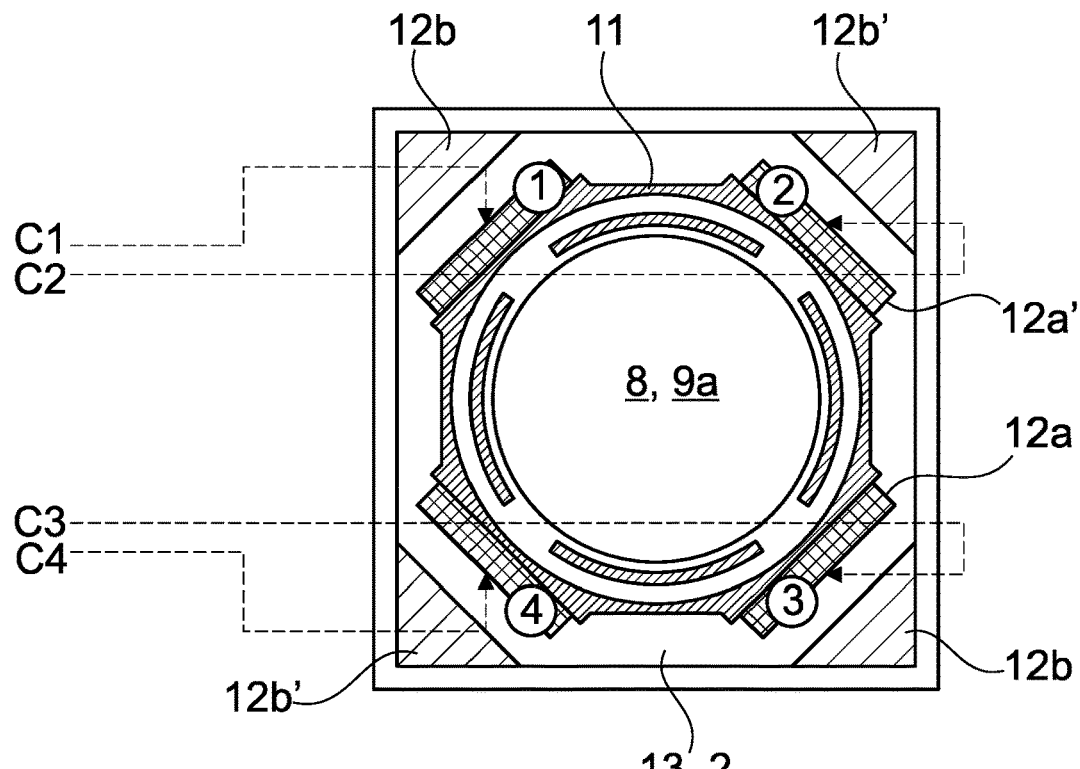
Figure 21:
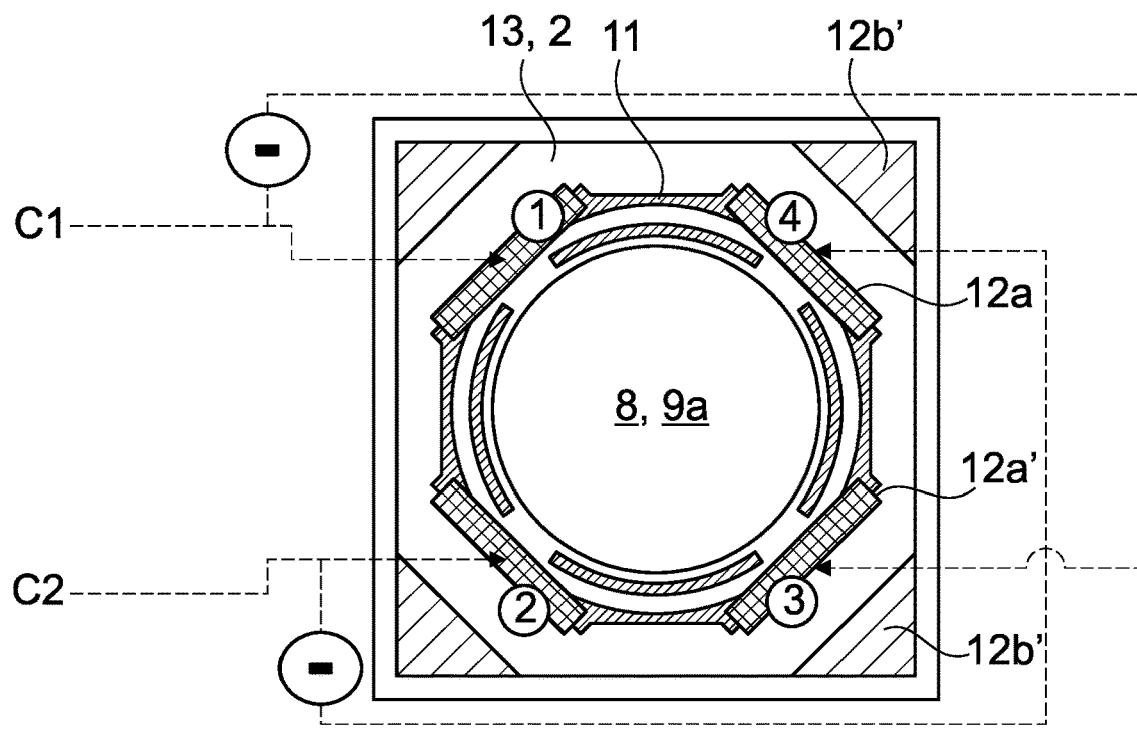
Figure 22:
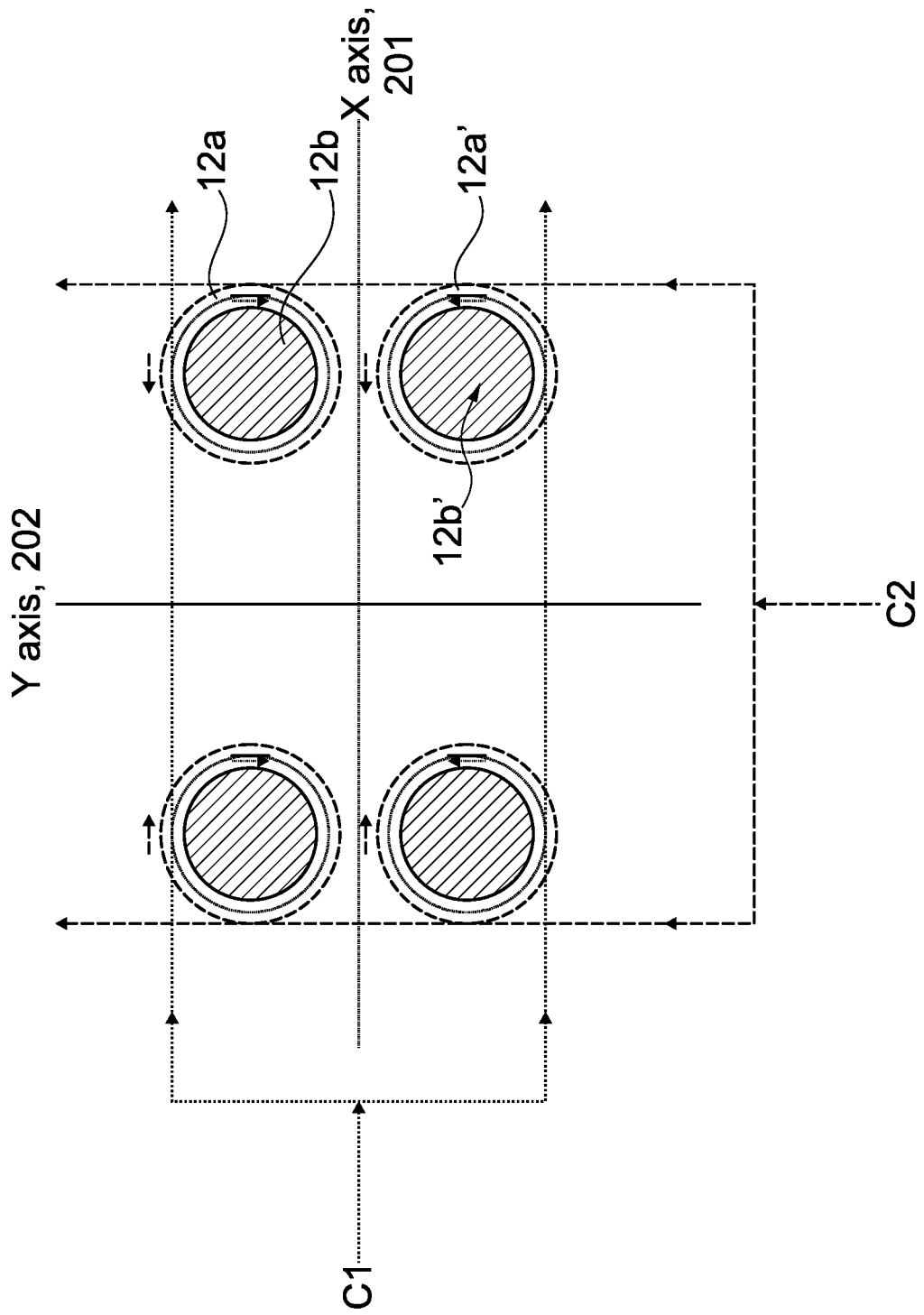
Figure 23:
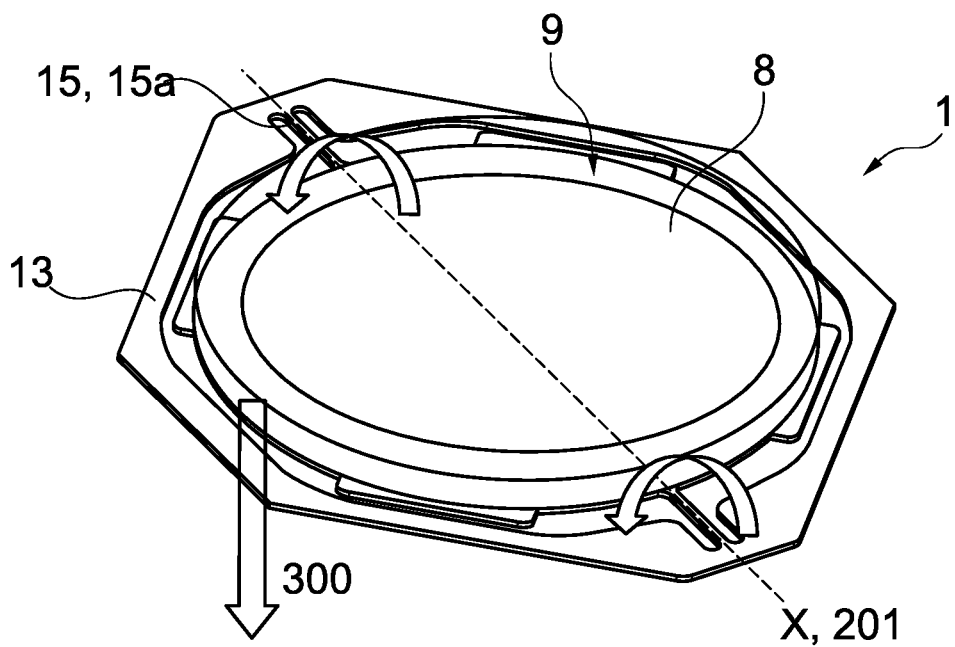
Figure 24:
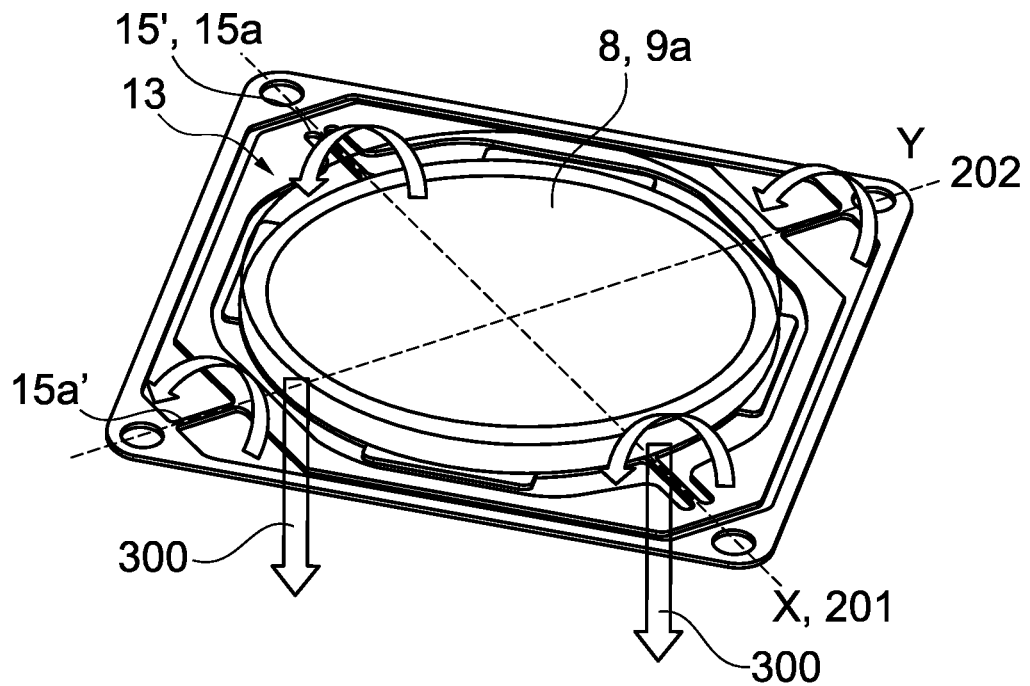
Figure 25:
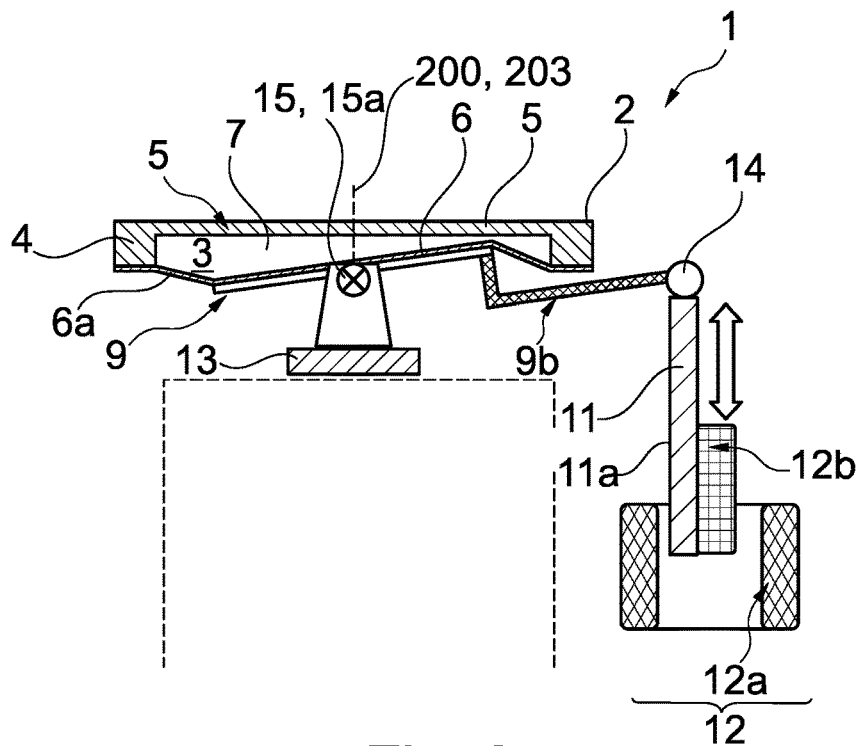
Figure 26:
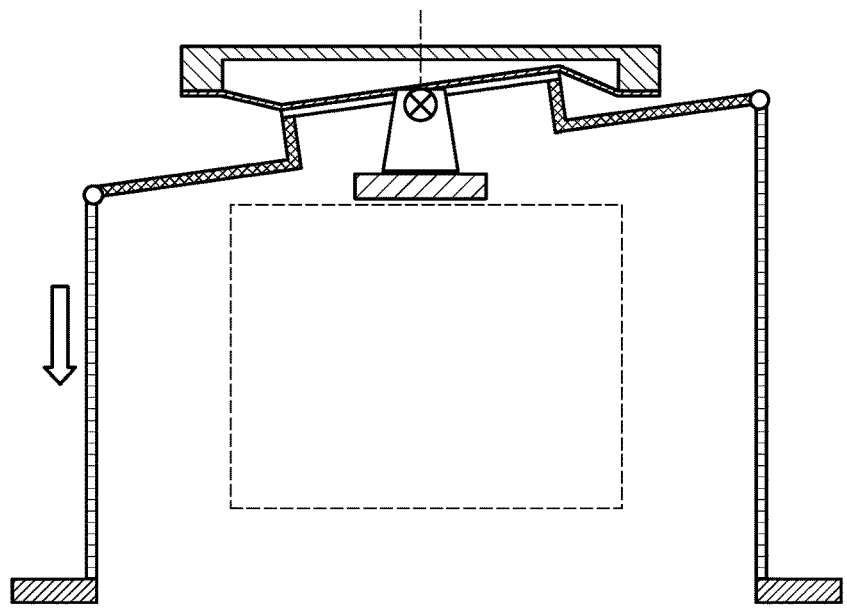
Figure 27:
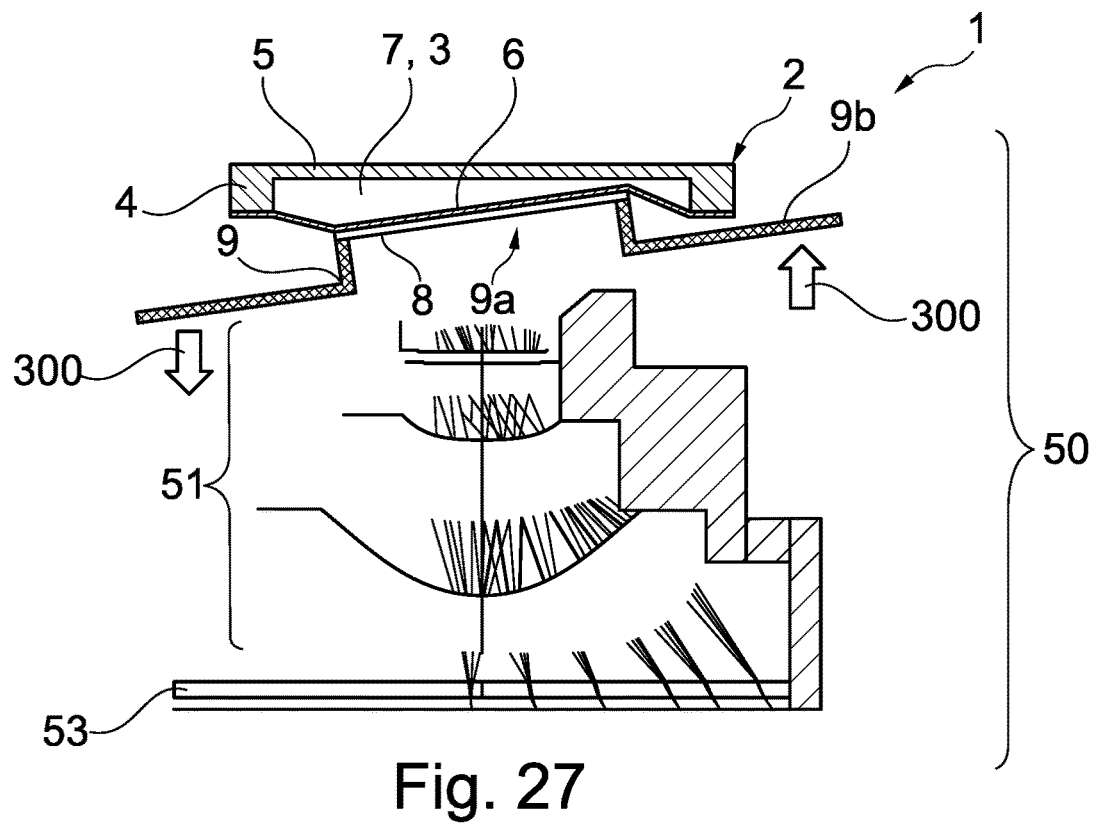
Figure 28:
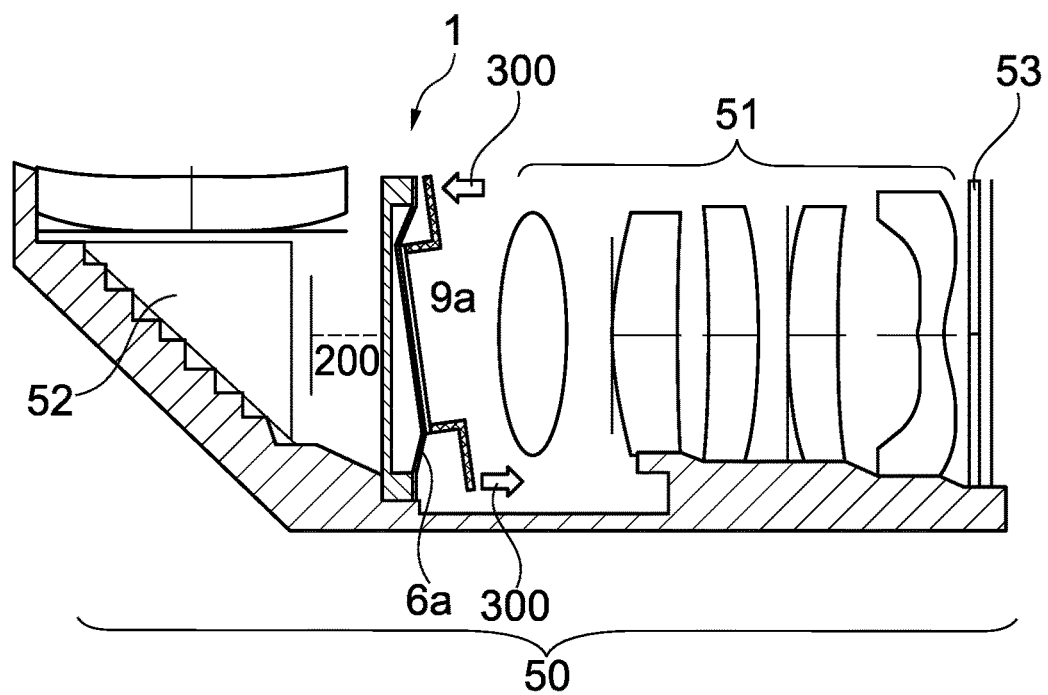
Figure 30:
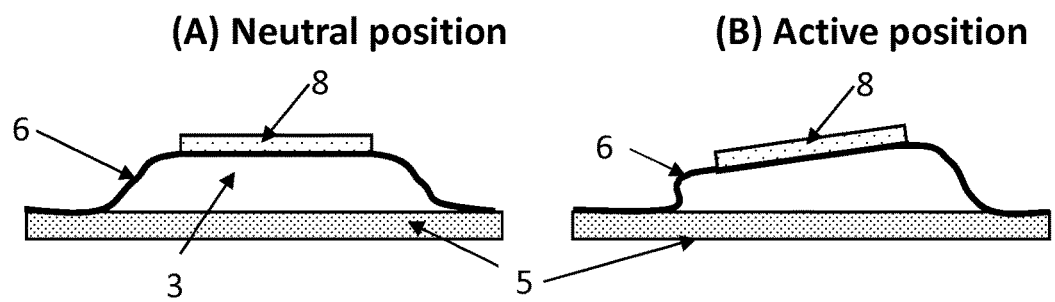
Figure 31:
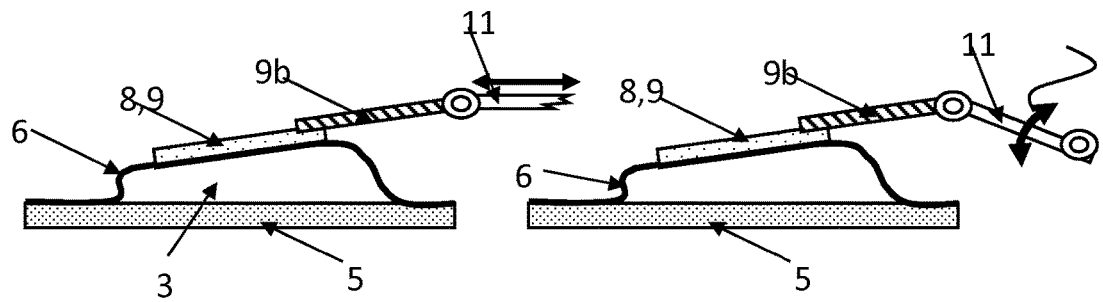
Figure 32:
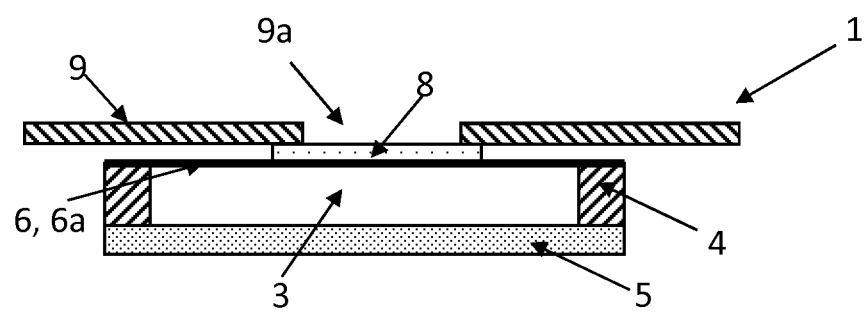
Figure 33:
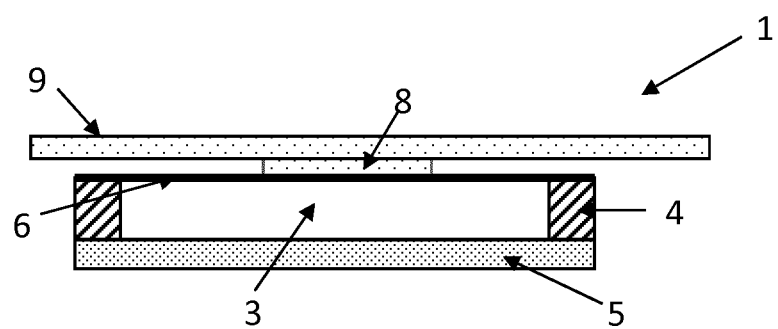
Figure 34:
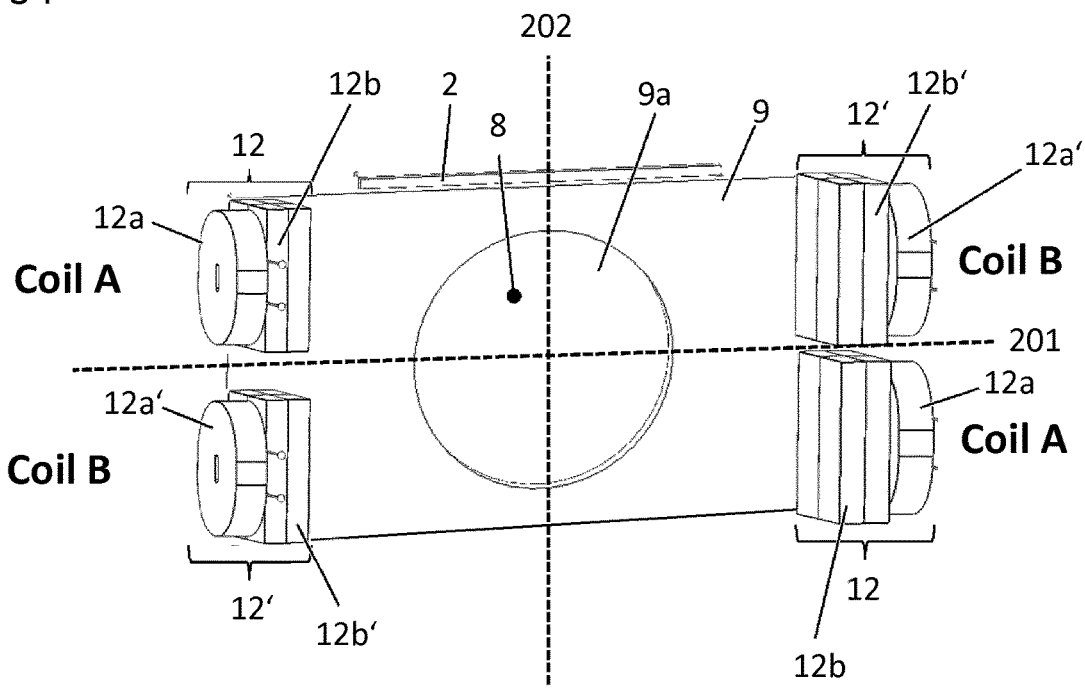
Figure 35:
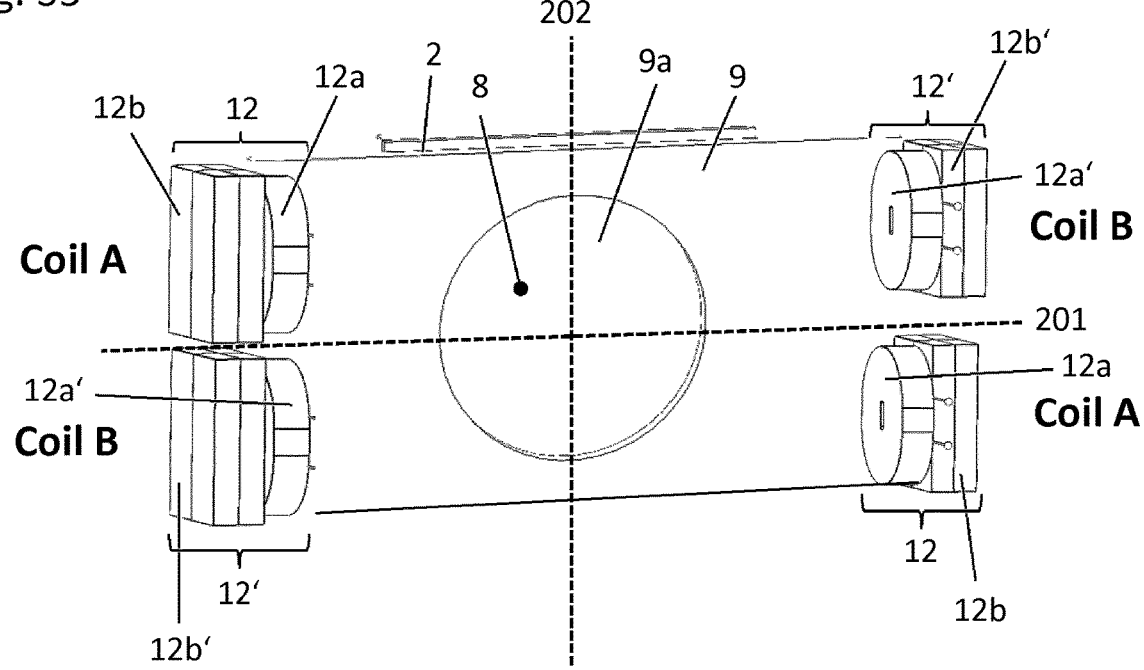
Figure 36:
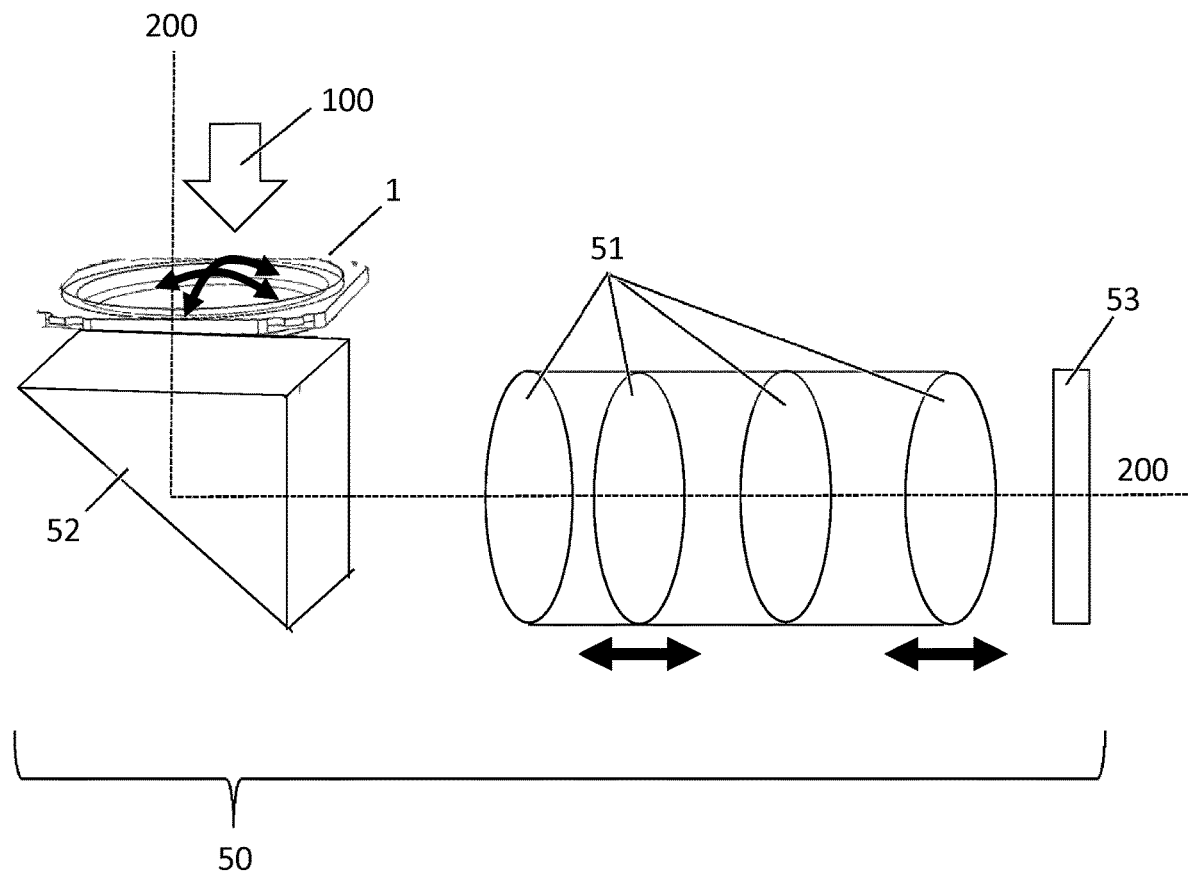

FIG. 1A+1B a schematic cross-sectional view of the tunable prism in a resting and tilted state;

FIG. 2 a schematic top view of a 2-axis tunable prism with a circular window;

FIG. 3 a schematic top view of a 1-axis tunable prism with a rectangular window;

FIG. 4 a schematic cross-sectional view of the tunable prism with a prism-shaping device;

FIG. 5 a three-dimensional view of the 2-axis tunable prism with a prism-shaping device;

FIG. 6 a three-dimensional view of a 1-axis tunable prism with a prism-shaping device;

FIG. 7 a three-dimensional view of a 1-axis tunable prism with a different prism-shaping device;

FIG. 8 a schematic cross-sectional view of the tunable prism with voice coil actuators and movers;

FIG. 9 a schematic cross-sectional view of an alternative configuration of the tunable prism with voice coil actuators and movers;

FIG. 10 a schematic cross-sectional view of the tunable prism with voice coil actuators without movers;

FIG. 11 a schematic cross-sectional view of the tunable prism with voice coil actuators, movers and a joint;

FIG. 12 a schematic cross-sectional view of an alternative configuration of the tunable prism with voice coil actuators, movers and joints;

FIG. 13 a schematic cross-sectional view of an alternative configuration of the tunable prism with rotating voice coil actuators;

FIG. 14 a detailing view for the rotating voice coil actuator;

FIG. 15 a three-dimensional view of a rectangular configuration of the tunable prism with 4 voice coil actuators on a substrate;

FIG. 17 a cross-section of a rectangular configuration of the tunable prism with 4 voice coil actuators on a substrate;

FIG. 18 a top view of a square-shaped implementation of the tunable prism;

FIG. 19 a top view of an alternative square-shaped implementation of the tunable prism;

FIG. 20 a driving scheme for the tunable prism with 4 channels;

FIG. 21 a driving scheme for the tunable prism with 2 channels;

FIG. 22 a driving scheme for the tunable prism with 2 channels and double coils;

FIG. 23 a perspective view of a tunable prism with a 1-axis gimbal;

FIG. 24 a perspective view of a tunable prism with a 2-axis gimbal;

FIG. 25 a cross-sectional view of a tunable prism with a gimbal and only one actuation means;

FIG. 26 a cross-sectional view of a tunable prism with a gimbal and shape memory alloy wires as actuation means;

FIG. 27 an imaging system with the tunable prism;

FIG. 28 another imaging system with the tunable prism;

FIG. 20 a cross-sectional view of a tunable prism with two membranes;

FIG. 30 a cross-sectional view of a tunable prism having the membranes attached to the bottom portion;

FIG. 31 a cross-sectional view of a tunable prism having the membranes attached to the bottom portion and with two different kinds of actuation motors; and FIG. 32 a cross-sectional view of a tunable prism having a plate with a hole as a prism-shaping device;

FIG. 33 a cross-sectional view of a tunable prism having a solid glass window as a prism-shaping device;

FIG. 34 a three-dimensional view of a tunable prism, with four voice coil actuators, wherein the magnets are fixed to the prism-shaping device;

FIG. 35 a three-dimensional view of a tunable prism, with four voice coil actuators, wherein the coils are attached to the prism-shaping device;

FIG. 36 an optical imaging system with a folded optical path and a tunable prism for image stabilization.

FIGURE DESCRIPTION

Figure 1B:
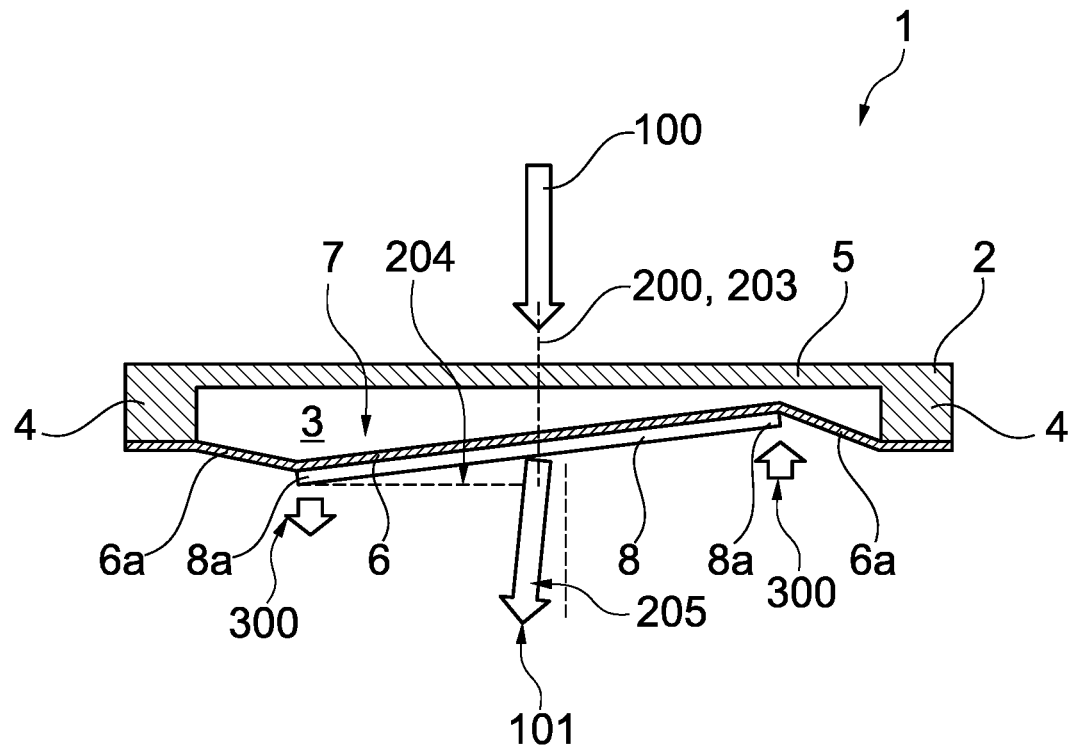

In FIG. 1A and FIG. 1B a basic embodiment of a tunable prism 1 is shown in a cross-sectional view and the basic working principle is demonstrated.

The tunable prism 1 comprises a container 2 filled with a transparent optical fluid 3. The container 2 has a planar bottom portion 5 consisting of glass. The bottom portion 5 is arranged such that it faces towards the side of incident light 100.

Furthermore, a wall member 4 delimits the container 2 laterally with respect to the optical axis 200. The wall member 4 is integrally formed with the bottom portion 5.

The optical axis 200 (broken lines) of the tunable prism 1 extends orthogonally and centrally through the bottom portion 5 along the z-axis 203.

The container 2 furthermore comprises an elastic membrane 6 arranged opposite the bottom portion 5 of the container 2. The elastic membrane 6 is repeatedly elastically expandable and stretchable. In its resting state (cf. FIG. 1A), the elastic membrane 6 extends under lateral tension parallel to the bottom portion 5. This tension provides a restoring force to the membrane 6 to return in its resting state, when no actuation force is applied.

The membrane 6 is sealed to the wall member 4 of the container 2 at its edges such that the fluid 3 cannot escape the volume 7 enclosed by the wall member 6, the bottom portion 5 and the membrane 6.

The fluid 3 can be a liquid or a gas. In this example, the container 2 comprises a liquid with a refractive index greater than the surrounding air, i.e. greater than 1.

On top of the membrane 6 facing away from the volume 7, a glass window 8 is attached to the membrane 6. In the resting state of the membrane 6, the glass window 8 is extends parallel to the bottom portion 5.

Between an outer edge 8a of the glass window 8 and the wall member 4 a circumferential portion 6a of the membrane 6 is not covered by the glass window 8. This portion is referred to as the elastically expandable portion 6a.

In the resting state shown in FIG. 1A, incident light 100 traverses the tunable prism 1 from the bottom portion 5 through the volume 7 to the window 8 without being deflected from the optical axis 200 as indicated by the arrows 100, 101.

When an actuation force 300 is applied to the outer edge 8a of the window 8, the window 8 tilts around at least one axis, referred to as the first axis 201, e.g. the x-axis. The window 8 can also be tilted around a second axis 202, e.g. the y-axis that is particularly orthogonal to the first axis 201 and—like the first axis 201—extends within the plane of extension of the window 8.

When the actuation force 300 is applied to the window 8, the window 8 experiences a tilting motion around the first and/or second axis 201, 202.

In the tilted state, the window 8 is not extending parallel to the bottom portion 5 but encloses a tilt angle 204 with the bottom portion 5 and the optical axis 200; a first section of the outer edge 8a of the glass window 8 is closer to the bottom portion 5, while another section of the outer edge 8*a* located opposite the first section is located further away from the bottom portion 5.

The elastically expandable membrane portion 6*a* around the outer edge 8*a* of the window 8 is stretched correspondingly. As the membrane 6 is elastic, particularly the elastically expandable membrane portion 6*a* conveys a restoring force to the tilted window 8.

In the tilted state of the tunable prism 1, traversing light 100, 101 exits the prism 1 at an angle 205 with respect to the optical axis 200. This is indicated by the arrows 100, 101 pointing into and outwards the tunable prism 1.

By adjusting the actuation force 300 on the window 8, the tilt angle 204 of the window 8 can be adjusted, which translates to an adjusted deflection angle 205 of the exiting light 101.

The relationship between the mechanical tilt angle 204 of the window 8 and the resulting deflection angle 205 of the light depends on the refractive index of the optical fluid 3, particularly the liquid. The higher the refractive index of the liquid 3, the stronger the resulting light deflection.

On the other hand, a low-refractive index liquid usually exhibits lesser dispersion than a high-refractive index liquid. Therefore, when chromatic aberrations should be avoided, a low-refractive index liquid can be used. Thus, particularly in polychromatic applications like imaging, a low-refractive index liquid is suitable. The refractive index of a low-refractive index liquid is for example around 1.30.

A high-refractive index liquid in turn is suitable for monochromatic applications such as iris detection. The refractive index of a high-refractive index liquid is for example around 1.56.

In case the fluid 3 in the volume 8 is a gas such as air, with a refractive index close to 1, the tunable prism 1 will not deflect traversing light 100, 101 at an angle 205 but laterally displace an incident light beam 100. Such a tunable prism 1 is also referred to as "beam displacer".

In FIG. 2 and FIG. 3 schematic top views of two different embodiments of the tunable prism 1 are shown. In FIG. 2 the window 8 and membrane 6 is circular i.e. the outer edge 8*a* of the window 8 and also an outer edge of the elastic membrane 6 follow a circular contour.

The outer contour of the container 2 is shaped as a square, while the volume 8 enclosed in the container 2 has a circular base area.

In FIG. 3 the outer contour of the container 2 is shaped as a rectangle, and the volume 8 enclosed in the container 2 has a rectangular base area.

In FIGS. 2 and 3 the circumferential elastically expandable membrane portion 6*a* is shown and the window 8 which is located centrally within this elastically expandable membrane portion 6*a*.

The distance of the outer edge 8*a* of the window 8 to the wall member 4 is constant over the whole circumferential elastically expandable membrane portion 6*a*. This leads to a constant restoring force independent of the tilt axis orientation.

In FIG. 2 the tunable prism 1 is tiltable around the first axis 201 (e.g. the x-axis) that extends within the plane of extent of the window 8, and also around the second axis 202, (e.g. the y-axis) that also extends within the plane of extent of the window 8 but orthogonally to the first axis 201.

A circular window 8 is suitable for tilting around two axes 201, 202, as the window 8 does not comprise any corner-like regions. Corner-like regions can lead to an increased stress on the elastic membrane 6 due to the corner-like shape.

The tunable prism 1 shown in FIG. 3 in turn is configured for tilting around the second axis 202 only. In order to reduce a potential stress from corner like regions 8*b* of the window 8, the corners of the rectangular window 8 are rounded.

The rectangular outline of the tunable prism 1 and particularly the rectangular window 8 are suitable to reduce size in the folded optics designs such as in tele- or zoom-lenses, where the plastic lenses are D-cut and rectangular apertures are used to block light going beyond the image sensor.

In FIG. 4 the tunable prism 1 of FIG. 2 is shown but additionally to the tunable prism 1 of FIG. 2, the tunable prism 1 of FIG. 4 has a prism-shaping device 9 attached to the window 8. The reference numerals are referring to the same components as already described in FIG. 1 and FIG. 2.

The prism-shaping device 9 is centrally arranged on the window 8, and has a clear aperture 9*a* such that light 100, 101" can traverse from the container 2 through the clear aperture 9*a*.

Two laterally extending actuation arms 9*b* of the prism-shaping device 9 are shown, to which an actuation force 300 is applied. The actuation force 300 is conveyed via the prism-shaping device 9 to the window 8 which assumes a tilted state with respect to the bottom portion 5 of the tunable prism 1.

The actuation force 300 in the example in FIG. 4 is simultaneously pressing down one actuation arm 9*b* of the prism-shaping device 9 and pulling away the other actuation arm 9*b'* of the prism-shaping device 9, which leads to a more precise tilting behavior of the tunable prism 1.

Three diameters are depicted in the schematic drawing of the tunable prism 1. The diameter dc is the diameter of the volume 7, dw is the diameter of the glass window 8 and ds is the diameter of the prism-shaping device 9 or more precisely the distance between the actuation force attacking points.

For a given tilt angle 204, the required actuation force 300 increases if dw is increased relative to dc, as the membrane 6 is stretched by a higher factor. On the other hand, the actuation force 300 is decreased if ds is increased due to a higher leverage arm.

Typically 1° of mechanical tilting requires approximately 1 mN to 5 mN actuation force 300. However, the relationship depends on the type of membrane 6 and ratios between the diameters dc, dw, and ds. The relationship between actuation force 300 and mechanical tilting angle 204 is approximately linear, particularly for actuation forces 300 between 0 mN and 1 mN.

In FIG. 5 a three-dimensional perspective view of the tunable prism 1 depicted in FIGS. 2 and 4 is shown. It can be seen that the prism-shaping device 9 comprises four actuation arms 9*b* for receiving an actuation force 300. The four actuation arms 9*b* are arranged pairwise opposite of each other, such that a two-dimensional tilting around the first and the second axis 201, 202 is possible by actuating the pairwise opposite actuation arms 9*b* correspondingly.

The central aperture of the prism-shaping device 9 is located centrally above the window 8. The container 2 comprising the volume 7 with the transparent fluid 3 has a square outer geometry. The prism-shaping device 9 is in contact with the window 8 along a circumferential section 10 of the outer edge of the window 8*a*.

An actuation force being applied to the prism-shaping device 9 particularly to the outer sections of the four actuation arms 9*b* is distributed along said circumferential contact section 10.

In FIG. 6 a three-dimensional perspective view of the tunable prism 1 depicted in FIG. 3 is shown. The prism-shaping device 9 attached on top of the rectangular window 8 comprises only two actuation arms 9b, 9b' for receiving an actuation force. The two actuation arms 9b, 9b' are arranged opposite of each other, such that a one-dimensional tilting around the first or second axis 201, 202 is possible by actuating the opposite actuation arms 9b, 9b' correspondingly.

The prism-shaping device 9 has a rectangular contour around the central aperture 9a that is centrally located above the rectangular window 8. The container 2 comprising the volume 7 with the transparent fluid 3 has a rectangular outer geometry.

The prism-shaping device 9 is in contact with the window 8 along a circumferential section 10 of the outer edge 8a of the rectangular window 8. An actuation force being applied to the prism-shaping device 9 particularly to the outer sections of the two actuation arms 9b, 9b' is distributed along said circumferential contact section 10. The central aperture 9a is formed and enclosed by the circumferential contact section 10 on the window 8.

It is noted that a corresponding cross-sectional view of the tunable prism 1 shown in FIG. 6 looks essentially identical to the cross-sectional view shown in FIG. 4.

In FIG. 7 an alternative prism-shaping device 9 for a tunable prism 1 as shown in FIG. 6 is depicted. The prism-shaping device 9 consists of two parts 9c, 9c' that are separated from each other, wherein each of the two opposite of each other arranged parts 9c, 9c' comprises an actuation arm 9b, 9b' that is in contact with the window 8, wherein the actuation arm 9b, 9b' is in contact in a section of the window 8 that is close to a section of the outer edge 8a of the window 8.

Both actuation arms 9b, 9b' nonetheless form a central aperture 9a on the window 8. The central aperture 9a is not delimited by a circumferential contact section but only by the contact sections 9c, 9c' of the two actuation arms 9b, 9b'.

This embodiment allows for a lighter built of the tunable prism 1.

In FIG. 8 a cross-sectional view of a tunable prism 1 that comprises additionally to the tunable prism 1 of FIG. 4, movers 11 that are rigidly attached to the prism-shaping device 9 and wherein the prism-shaping device 9 comprises actuation means 12 in form of voice coil actuators 12, 12'.

The cross-section is essentially identical for two and one-dimensional tunable prisms 1, i.e. for window 8 and prism-shaping device 9 geometries that are configured for tilting around the first and/or the second axis 201, 202, as the second axis 202 is not shown and would particularly extend outwards and inwards the cross-sectional plane.

Without restriction, the following description is limited to the visible cross-sectional view, explicitly including embodiments that are tiltable around two axes 201, 202. For two-axes embodiments the visible components can be arranged correspondingly on the second axis 202 or parallel to the depicted components.

In the cross-sectional view, two movers 11, 11', also referred to as movable parts in the specification, are attached to the actuation arms 9b, 9b' of a prism-shaping device 9. The movers 11, 11' enclose an angle of 90° with the actuation arms 9b, 9b' of the prism-shaping device 9, wherein the actuation arms 9b, 9b' of the prism-shaping device 9 extend parallel to the window 8 plane.

On the free end portions 11 a, 11a' of the movers 11, 11' the voice coil actuators 12, 12' are arranged.

Each voice coil actuator 12, 12' comprises a voice coil portion 12a, 12a' and a magnetic portion 12b, 12b'.

In the depicted example of FIG. 8 the voice coil portion 12a, 12a' is attached to the free end portion 11a, 11a' of the respective mover 11, 11', wherein the magnetic portion 12b, 12b' is arranged rigidly for example on a substrate 13 or the container 2.

The voice coil portion 12a, 12a' is electrically contacted with a flexible electrical connector 12c that simultaneously serves as a stabilization spring. When an electric current is applied to the voice coil portions 12a, 12a', the voice coil portions 12a, 12a' move relatively to the magnet portions 12b, 12b'.

In this example, not only are the voice coil portions 12a, 12a' moved in a translational manner along the optical axis 200, but also in a rotational manner. The generated actuation force 300 from the voice coil actuators 12, 12' is conveyed by the movers 11, 11' to the prism-shaping device 9 that in turn tilts the window 8 attached to the membrane 6 of the tunable prism 1.

The movers 11, 11' and the voice coil actuators 12, 12' are arranged outside the clear aperture 9a of the prism-shaping device 9.

FIG. 9 depicts a similar embodiment as shown in FIG. 8. The only difference between the two embodiments is that the magnetic portion 12b, 12b' and the voice coil portion 12a, 12a' are swapped, i.e. the voice coil portions 12a, 12a' are rigidly connected to either the substrate 13 or the container 2, wherein the magnetic portions 12b, 12b' are attached to the free end portions 11a, 11a' of the movers 11, 11'.

This embodiment does not need a flexible electrical connector to the voice coil portion 12a, 12a' and exhibits a better actuation linearity.

FIG. 10 depicts a similar embodiment as shown in FIG. 9 except that the tunable prism 1 does not comprise movers that are rigidly attached to the actuation arms 9b, 9b' of the prism-shaping device 9. In this embodiment, the magnetic portions 12b, 12b' are directly attached to the actuation arms 9b, 9b' of the prism-shaping device 9. This simplified version has a smaller lever arm and exhibits less lateral movement upon tilting the window 8.

FIG. 11 shows the same tunable prism 1 as depicted in FIG. 8 except that the movers 11, 11' are not rigidly connected to the actuation arms 9b, 9b' of the prism-shaping device 9 but that the movers 11, 11' are flexibly connected to the actuation arms 9b, 9b' of the prism-shaping device 9. This is achieved by a joint 14 between the mover 11, 11' and the respective actuation arm 9b, 9b' of the prism-shaping device 9.

The joint 14 can be for example an elastic glue spot, a mechanical joint or a spring-like joint made from a spring steel.

This embodiment allows a purely translational motion of the voice coil actuator 12, 12' and consequently the mover 11, 11', wherein said translational motion is translated by the joints 14 into a tilting motion for the prism-shaping device 9 and the window 8 attached to the prism-shaping device 9.

In an analogue manner, FIG. 12 shows the same embodiment as depicted in FIG. 9 except that the movers 11, 11' are attached to the actuation arms 9b, 9b' of the prism-shaping device 9 with such a joint 14.

Also here, a better linearity and reduced translational motion of the window 8 is achieved as compared to the embodiments shown in FIG. 9.

The joint 14 can be for example an elastic glue spot, a mechanical joint or a spring-like joint made from a spring steel.

In FIG. 13 the window 8 is connected to a voice coil actuator 120 that is configured to generate a rotational motion/force. In the cross-section, the bottom portion 5 and the wall member 4 of the container 2 are shown as well as the optical fluid 3 comprised the volume 7 of the container 2. The top side of the container 2 is covered by the membrane 6 and the window 8 that is attached to the membrane 6. On the outer sections of the window 8 a rotation axis 120*d* of a voice coil actuator 120 is attached to the window 8. The voice coil portion 120*a* is rigidly attached to the rotation axis 120*d* and is rotatable with respect to the magnetic portion 120*b* that is attached for example to a substrate 13 that is non-movably connected with the container 2.

The magnetic portion 120*b* comprises a magnet 120*e* as well as a magnetic return structure 120*f* (cf. e.g. FIG. 14). Not shown are the electrical connectors to the voice coil portion 120*a*.

The return structure 120*f* and the magnet 120*e* are shaped such that laterally displaced actuation forces 300 of opposite direction on each side of the magnetic return structure 120*f* are generated that result in a rotation of the voice coil portion 120*b* (FIG. 14). The electric currents are depicted as arrows 301.

Figure 16:
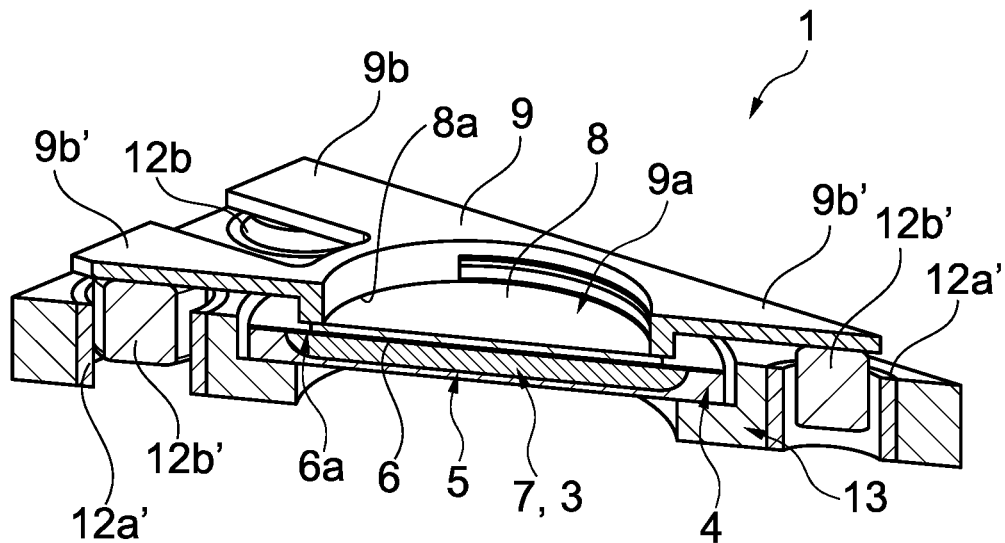

In FIGS. 15 and 16 a three-dimensional view of a tunable prism 1 that is tiltable along two dimensions, i.e. the first and the second axis 201, 202, is shown. In FIG. 15 the perspective view of the tunable prism 1 is shown, wherein in FIG. 16 a cut perspective view of the same prism 1 is depicted.

The tunable prism 1 comprises a printed circuit board substrate 13 that is shaped rectangular. The long side of the rectangle of the substrate 13 is less than 10 mm, wherein the short side is less than 5 mm.

On the substrate 13 four actuation means 12 in form of voice coil actuators 12, 12' are arranged. The cylindrically shaped voice coil portions 12*a*, 12*a'* are rigidly connected to the substrate 13 and each voice coil portion 12*a*, 12*a'* encloses a corresponding magnetic portion 12*b*, 12*b'* consisting of a magnet.

Each voice coil actuator 12, 12' is arranged such that the magnets are dipping into the coil portions 12*a*, 12*a'*. This provides a good linearity between drive current and the resulting actuation force over the entire tilting range. The voice coil actuators 12, 12' are arranged at the corner portions of the substrate 13.

Centrally arranged on the substrate 13 is the container 2 that is rigidly attached to the substrate 13. The container 2 is arranged such on the rigid substrate 13 that the transparent bottom portion 5 of the container 2 is arranged centrally on top of a clear aperture of the substrate 13, such that light can enter the tunable prism 1 from the transparent bottom portion 5 and propagate towards the glass window 8, where it can exit the tunable prism 1 through the clear aperture 9*a* of the prism-shaping device 9.

The container 2 and the substrate 13 are two separate parts that are rigidly connected with each other. The bottom portion 5 and the wall member 4 of the container 2 are made of glass.

The membrane 6 covers the liquid filled volume 7 of the container 2 and is sealed to the wall member 4. On top of the membrane 6 a circular glass window 8 is attached to the membrane 6. The prism-shaping device 6 is arranged with its clear aperture 9*a* centrally on top of the window 8.

The clear aperture 9*a* of the prism-shaping device 9 can be greater than 3.6 mm in diameter.

The prism-shaping device 9 furthermore comprises four actuation arms 9*b*, 9*b'*, each arm 9*b*, 9*b'* extending towards a respective voice coil actuator 12, 12'.

The magnetic portions 12*b*, 12*b'* of the voice coil actuators 12, 12' are rigidly attached to the actuation arms 9*b*, 9*b'* of the prism-shaping device 9.

The voice coil actuators 12, 12' can provide tilting forces around the first and the second axis 201, 2020 to the prism-shaping device 9 by moving along the z-axis 200 of the substrate 13 that corresponds to the z-axis 13 of the bottom portion 5 of the container 2.

Accordingly, the window 8 can be tilted around said first and/or second axis 201, 202.

The first and second axis 201, 202 extend parallel to the rectangular sides of the substrate 13.

This embodiment demonstrates a very compact design of a tunable prism with a footprint that is 5 mm×10 mm or smaller with a clear aperture of 3.6 mm or larger.

FIG. 17 shows an embodiment as depicted in FIG. 16 except that in this embodiment the container 2 is integrally formed with the substrate 13. That means that the container 2 comprises also features of the substrate 13 or vice versa.

The transparent bottom portion 5 is bonded to the substrate 13 that comprises the wall member 4. The wall member 4 of the container 2 is covered with a dark metal coating 4*a* for suppressing stray light contributions and also for improved bonding stability with the bottom portion 5.

The membrane 6 covers the volume 7 filled with liquid and is sealed to the wall member 4.

The actuation means 12, 12' and the other components of the depicted embodiment are essentially identical to the embodiments shown in FIG. 16.

This embodiment provides an ultra-compact design of a tunable prism 1.

In FIG. 18 a variant of a tunable prism 1 with voice coil actuators 12, 12' is shown in a schematic top view.

Here, the substrate 1 has a square contour which is delimited by four side walls 13*a*, 13*a'* forming a corner region 13*b* between adjacent side walls 13*a*, 13*a'*. In each corner region 13*b* the magnetic portion 12*b*, 12*b'* of a voice coil actuator 12, 12' is arranged such that the four voice coil actuators 12, 12' are arranged pairwise opposite of each other along the diagonals of the substrate 13.

Thus, by moving the voice coil actuators 12, 12' in opposite directions, the prism-shaping device 9 and the window 8 can be tilted around the first and second axis.

In the centre of the substrate 13 the container 2 with the circular membrane 6 and the circular window 8 is arranged. On top of the window 8 the prism-shaping device 9 is arranged, wherein the prism-shaping device 9 is connected to a circumferential mover 11 to which the voice coil portions 12*a*, 12*a'* are attached such that they are arranged opposite the magnetic portions 12*b*, 12*b'*.

This tunable prism 1 comprises four voice coil actuators 12, 12' for a 2-axis tunable prism 1 in a square geometry.

Similarly to the embodiment shown in FIG. 18, FIG. 19 depicts basically the same tunable prism 1 but this time the magnetic portions 12*b*, 12*b'* are not arranged in the corner regions 13*b* of the substrate 13 but on the side walls 13*a*, 13*a'*. Nonetheless, the magnetic portions 12*b*, 12*b'* are arranged pairwise opposite of each other. Also the voice coil portions 12*a*, 12*a'* are at respective different positions as compared to FIG. 18 such that they are arranged opposite the magnetic portions 12*b*, 12*b'*.

In FIG. 20 it is shown, how a tunable prism 1 according to the invention with four voice coil actuators 12, 12' can be controlled using a driver electronics with four channels c1, c2, c3, c4 for controlling the four voice coil actuators 12, 12'.

For this purpose each channel c1, c2, c3, c4 (depicted as broken lines), is connected to one voice coil actuator 12, 12'. The channel provides an electric current to the respective voice coil.

As the driver comprises four independent channels c1, c2, c3, c4, each actuator 12, 12' can be controlled with an electric current of different magnitude and sign. This embodiment provides the greatest degree of flexibility in terms of tilt-control of the tunable prism 1.

However, as shown in FIG. 21, it is possible to control a tunable prism comprising four voice coil actuators 12, 12' with a driver having only two channels c1, c2; a first and a second channel. For this reason, each channel c1, c2 is connected to two diagonally opposite arranged voice coil actuators 12, 12'. Both actuators 12, 12' therefore receive the same magnitude of electric current, but to one of the two voice coil actuators 12' the electric current is provided with an inverted polarity (indicated by the encircled minus sign), causing the voice coil actuator 12 to generate a motion in the opposite direction. For example, if one of the diagonally opposite arranged voice coil actuators 12 is provided an electric current of 30 mA by the first channel c1, the opposite voice coil actuator 12' is provided with an electric current of −30 mA by the first channel c1.

With this kind of opposite motion, a tilting of the window 8 is achieved around one axis 201, 202 with only one channel c1, c2. Accordingly, the two other diagonally opposite arranged voice coil actuators 12, 12' can be controlled with the second channel c2.

In FIG. 22 a connection scheme for a tunable prism comprising four voice coil actuators 12, 12' for 2-dimensional tilting is depicted that can be driven with a driver having only two channels c1, c2.

In this embodiment the voice coil portions 12a, 12a' comprise double coils. Here, no inversion of the electric current sign is needed in order to achieve opposite motion of diagonally opposite arranged voice coil actuators 12, 12'. Instead, each channel c1, c2 is connected such to the respective double coils of the diagonally arranged voice coil portions 12a, 12a' that the respective magnetic portions 12b, 12b' experience an opposite force upon provision of an electric current. This causes a motion of diagonally arranged voice coil actuators 12, 12' in opposite directions, which in turn leads to a tilting of the window 8.

The arrows on the broken lines depicting the first and the second channel c1, c2 of the driver indicate the direction of the electric current.

In FIG. 23 an embodiment of the tunable prism 1 is shown that is rotatable around the first axis only 201. In order to stabilize the titling motion and to prevent lateral motions of the window 8 upon tilting, the tunable prism 1 comprises a single-axis gimbal 15.

Similar to the previous examples, the substrate 13 has a square geometry. In the centre, the substrate 13 comprises a recess in which the container 2 is arranged and rigidly connected to the substrate 13.

The membrane 6 covers the volume, in which the liquid is comprised. On top of the membrane 6 the window 8 is arranged and connected to the prism-shaping device 9. The prism-shaping device 9 is connected on two opposite sides to an axis 15a of the gimbal 15. The gimbal axis 15a rotatably connects the substrate 13 with the prism-shaping device 9. The gimbal axis 15a allows a tilting of the prism-shaping device 9 around the first axis 201 of the window 8 relative to the bottom portion 5, while no lateral nor translational motion of the window 8 is possible, due to the fixing of the tilt axis, i.e. the first axis 201, with the gimbal axis 15a.

Therefore, an actuation force, even if conveys a translational component will only yield a rotational motion to the window 8.

The gimbal axis 15a extends along a diagonal of the square substrate 13 and can be made from a spring steel. Consequently, the first axis 201 extends along the gimbal axis 15a.

In FIG. 24 a similar embodiment of the invention is depicted as in FIG. 23. In contrast to the embodiment of FIG. 24, the gimbal is a two-axes gimbal 15' that allows a two-dimensional tilting of the prism-shaping device 9 and thus the window 8 around the first and the second axis 201, 202 independently.

For this reason, the prism-shaping device 9 is mounted on the gimbal 15', while the container 2 is rigidly connected to the substrate 13. Two-axis gimbals 15' are known to the person skilled in the art. In the present example, the first and second axis 201, 202 each extend along one gimbal axis 15a, 15a' diagonally along the square-shaped substrate 13.

This embodiment allows for a tilting of the window 8 with respect to the bottom portion 5 of the container 2, without any lateral or translational motion.

Therefore, a more accurate tilting behaviour is achieved, even if the actuation means provides an actuation force that comprises lateral force components.

As the gimbal 15, 15' provides fixed rotation axes 15a, 15a' the following embodiment allows the tilting around the first axis 201 with only one actuation means 12, namely one voice coil actuator.

In FIG. 25 a cross-sectional view of a gimbal-based embodiment is shown. The gimbal axis 15a extends orthogonally outwards the cross-sectional plane and the gimbal axis 15a is connected with one end to the substrate 13. The bottom portion 5 of the container 2 in this example faces upwards, while the membrane 6 and the window 8 are arranged in the embodiment face down.

The prism-shaping device 9 is connected with an actuation arm 9b via a joint 14 to a mover 11 like in the embodiment shown in FIG. 12.

However, contrary to the embodiment shown in FIG. 12, the tunable prism 1 comprises only one actuation means 12 for the tilting of the window 8 around the first axis 201, namely a voice coil actuator. As the gimbal 15 provides a fixing to the first axis 201, an asymmetrical force component conveyed to the prism-shaping device 9 does not yield a translational motion of the window 8 but only a rotational motion.

This embodiment allows for a cost-effective embodiment of the invention.

In FIG. 26 an alternative embodiment with respect to the actuation means is shown in a cross-sectional view of the tunable prism 1. The tunable prism 1 comprises a gimbal 15 whose gimbal axis 15a is pointing outwards the cross-sectional plane.

The prism-shaping device 9 is connected to the gimbal axis 15a such that a rotational force can be conveyed to the window 8 with a fixed rotation axis 15a, 201.

The two arms 9b, 9b' extending laterally outwards of the prism-shaping device 9 each are connected via a joint 14 directly to the corresponding actuation means 12g, which is a shape memory alloy wire 12g.

If an electric voltage is applied to the shape memory alloy wire 12g, the shape memory alloy wire 12g contracts along a predefined direction, here along the z-axis 200, and thus conveys a pulling actuation force 300 to the prism-shaping device 9.

This embodiment can be applied to a two-dimensional tunable prism 1.

In FIG. 27 and FIG. 28 an imaging system 50 comprising the tunable prism 1 according to the invention is shown. The tunable prism 1 is used for optical image stabilization. For this reason it is arranged on front, i.e. on the entrance side of the imaging system optics 51.

By tilting the window 8 of the prism 1 accordingly, a lateral motion of the imaging system 50 can be compensated optically such that a projected image on the image sensor 53 is not moving.

The prism 1 can be arranged in folded or no-folded light path of imaging system 50.

In FIG. 27 the tunable prism 1 is for example arranged in front of a wide-angle compact camera module e.g. for polychromatic imaging or monochromatic iris recognition.

In FIG. 28 the imaging system 50 is a small-angle tele-camera module or a zoom lens with a folding mirror 52.

Figure 29:
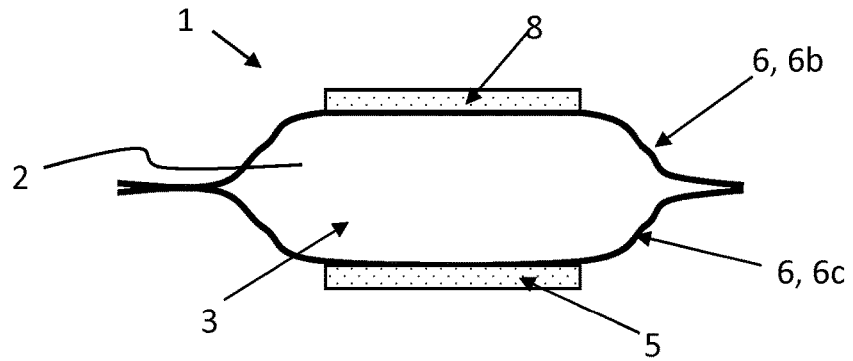

In FIG. 29 an embodiment of the tunable prism 1 is shown that comprises a minimum number of components and that is particularly well suited for cost efficient production.

The container 2 consists of only the transparent bottom portion 5, the glass window 8 and two deformable, particularly elastic membranes 6,6a,6b that are sealed with each other in order to form the closed container volume comprising the liquid 3. This embodiment forms a bellows. Such a double-membrane bellows-container 2 further minimizes the required actuation force for tilting the window 8 around the first or second axis and on the other hand maximizes the ratio between clear aperture 9a and outer diameter of the window 8.

Any previously introduced actuation concept (VCM with air-coils or embedded PCB-coils, SMA, Reluctance motor) and prism-shaping device type can be applied.

In FIG. 30 another embodiment of the tunable prism 1 is shown. This embodiment comprises only one membrane 6 that is sealed to the bottom portion 5. The edges of the bottom portion 5, where the membrane 6 is sealed to, can also be understood as wall members 4.

In the left panel of FIG. 30 the neutral positon (light passes through the prism 1 without being deflected) with a non-tilted window 8 is shown, wherein on the right panel of FIG. 30 the window 8 is tilted with respect to the bottom portion 5, such that light is deflected when passing through the prism 1.

The container 2 comprises the liquid 3. The membrane 6 is deformable but not necessary elastic.

The container 2 acts like a bellows when the prism-shaping device is actuated (not shown).

Such a bellows-container 2 would require less actuation force and maximize the ratio between clear aperture 9a and outer diameter because the membrane 6 is mainly deformed in axial direction, i.e. parallel to the optical axis and not in radial direction.

FIG. 31 shows the tunable prism 1 from FIG. 30, with two different actuation means. The bellows-like container 2 offers the possibility for new actuation types.

In the left panel, a radial translation motor (indicated by the components 9b and 11) is used to tilt the window 8, wherein in the right panel a swivel bearing motor (indicated by the components 9b and 11) is used to tilt the window. The actuation motion of the respective motor is indicated by the double arrow at the movers 11.

Thus, any actuation concept such as VCM with air-coils or embedded PCB-coils, SMA, Reluctance motor and prism-shaping device 9 can be applied to this embodiment.

Both actuation concepts (translation motor or swivel bearing motor) require very low actuation forces since the window 8 is "swimming" on the liquid 3 and cause minimal membrane 6 stretching.

In this embodiment the prism-shaping device 9 and the container window 8 are integrally formed.

In FIG. 32 a tunable prism 1 similar to the tunable prism 1 of FIG. 4 is shown, wherein the tunable prism 1 comprises a prism-shaping device 9 that consists of a plate with a hole that serves as the clear aperture 9a. The plate is connected to the window 8. The actuation concepts disclosed herein can be applied to this tunable prism 1 in a straight-forward fashion.

In FIG. 33 an alternative to the prism-shaping device 9 shown in FIG. 4 is depicted, the prism-shaping device 9 of FIG. 33 consists of a glass window. This allows maximizing the optically usable clear aperture 9a as no shading would occur in the interface between the prism-shaping device 9 and the window 8 of the container 2. The clear aperture 9a according to this example is a transparent portion of the prism-shaping device 9. Any previously introduced actuation concept can be applied to this kind of prism-shaping device straightforwardly.

FIG. 34 a three-dimensional view of a tunable prism 1 that is tiltable along two axes 201, 202, the x- and y-axis, is shown.

This embodiment demonstrates a very compact design along the y-axis 202 (dotted line) of the tunable prism 1 with a footprint that is 5 mm×10 mm or smaller with a clear aperture 9 of 3.6 mm or larger.

The compact design along the y-direction 202 allows for including said device 1 for example in small mobile devices, such as mobile phones with a camera or other imaging systems where space is precious.

In order to keep the extent along the y-axis 202 small, the prism-shaping device 9 is formed elongated along the x-axis 201, as can be seen also in FIGS. 15, 16 and 17.

On the elongated prism-shaping device 9 the actuation magnets 12b, 12b' are arranged, wherein the coils 12a, 12a' are fixed to a portion of the tunable prism 1 or another device that remains fixed with respect to the prism-shaping device 9.

The magnets 12b, 12b' and the coils 12a, 12a' are arranged such with respect to each other that the actuation forces generated by the actuators 12, 12' point essentially along (or opposite) the optical axis, such that the window 8 on the membrane can be tilted by actuating one or more of the actuators 12, 12'.

Moreover, the actuators 12, 12' and particular the magnets 12b, 12b' are arranged laterally along the x-axis 201 of the clear aperture 9, wherein the actuators 12, 12' are arranged only slightly shifted off-axis with respect to the x-axis 202, such that the tunable prism 1 adopts a small space along the y-axis 202.

The coils 12a, 12a' can be controlled and connected pairwise as indicted by the letter "Coil A" and "Coil B".

The magnets 12b, 12b' in this embodiment are axially polarized and the specific orientation of the magnets allows to arranging the actuators 12, 12' essentially along the optical axis.

FIG. 35 shows a similar embodiment compared to that of FIG. 34. The only difference is that the coils 12a, 12a' are arranged on the prism-shaping device 9 and the magnets 12b, 12b' are fixed to some outer device or portion that remains fixed with respect to the tiltable window 8.

FIG. 36 shows an application example of the tunable prism 1 for a folded optics of an imaging system 50. Here, the tunable prism 1 is arranged to provide lateral image stabilization. The tunable prism 1 is located in front of a folding prism 52 that is configured to fold the light path 200 to subsequent optics, in this case a lens barrel, comprising a plurality of lenses 51 for imaging. The lens barrel is arranged in front of an image sensor 53. The lens barrel can comprise adjustable particularly movable lenses 51 so as to shift the focus or provide an optical zoom to the imaging system 50. The incident light is depicted as an arrow 100.

In this configuration the tunable prism 1 can serve as an active optical image stabilization means that can be configured to counteract lateral movement of the imaging system 50.

The tunable prism 1 according to the invention can be used an comprised in a variety of applications relying on optics such as for example, unmanned aerial vehicles, cameras, particularly surveillance cameras, traffic cameras, range finders, objectives, microscopes, mobile phone's front of rear cameras, in particularly in stacked camera barrels, folded optical path cameras or optics, such as often used in macro cameras, wide angle cameras or, tele- and zoom-cameras.

REFERENCES 1 tunable prism
2 container
3 fluid
4 wall member
4a coating
5 bottom portion
6 membrane
6a elastically expandable membrane portion
6b, 6c membrane members
7 volume
8 window
8a Outer edge of window
8b corner-like region
9 prism-shaping device
9a clear aperture
9b, 9b' actuation arms
9c, 9c' two parts of the prism-shaping device
10 circumferential contact section
11, 11' movable part, mover
11a, 11a' free end of the mover
12, 12', 120 actuation means, voice coil actuator
12a, 12a' 120a voice coil portion
12b, 12b', 120b magnetic portion
12c electrical connector
120d coil rotation axis
120e magnet
120f return structure
12g shape memory alloy wire
13 substrate
13b corner region
13a, 13a' side wall
14 joint
15, 15' single-axis gimbal
15a, 15a' gimbal axis
50 imaging system
51 lenses
52 folding mirror
53 image sensor
100 incident light
101 exiting light
200 optical axis
201 first axis, x-axis
202 second axis, y-axis
203 z-axis
204 tilt angle
205 deflection angle
300 actuation force
301 electric current
c1, c2, c3, c4 driver channels

The invention claimed is:

1. Tunable prism for optical image stabilization, comprising the components:
a container that comprises a membrane comprising at least a transparent portion, the container further comprising a transparent rigid bottom portion facing the membrane, wherein the membrane is connected to the bottom portion, and wherein the container encloses a volume that is filled with a transparent fluid, a transparent window arranged on the membrane, wherein the membrane comprises a deformable portion extending around an outer edge of the window, such that the window can be tilted around a first and/or a second axis with respect to the bottom portion, wherein the window is arranged on a side of the membrane that is faces outwards the volume filled with the transparent liquid, wherein the tunable prism further comprises a prism-shaping device, wherein the prism-shaping device is in contact with the window, wherein the prism-shaping device has a clear aperture that is arranged centrally over the window, wherein the prism-shaping device is configured to tilt the window around the first and/or second axis by conveying an actuation force on the window, wherein the prism-shaping device is arranged outside the volume filled with the transparent liquid.

2. Tuneable prism according to claim 1, wherein the membrane is sealingly connected with the bottom portion.

3. Tunable prism according to claim 1, wherein the tunable prism further comprises the components:
a rigid wall member, wherein the bottom portion and the wall member are rigidly connected and the membrane is sealingly connected to the wall member, wherein the deformable portion of the membrane extends between the outer edge of the window and the wall member.

4. Tunable prism according to claim 3, wherein the wall member comprises at least on a side of the wall member that faces the volume a light-absorbing layer or wherein the wall member consists of a light-absorbing compound.

5. Tunable prism according to claim 1, wherein the first and/or the second axis extend parallel to or in a plane of extent of the window, and particularly wherein the first and/or second axis are oriented orthogonally to each other.

6. Tunable prism according to claim 1, wherein the actuation force is conveyed on the window on at least one section of the window that is located outside the clear aperture.

7. Tunable prism according to claim 6, wherein the clear aperture of the prism-shaping device is transparent and massive, or wherein the prism-shaping device is transparent and massive.

8. Tunable prism according to claim 6, wherein the prism-shaping device is in contact on two opposite sections of the window, wherein the sections are located outside the clear aperture and wherein the prism-shaping device is configured to convey an actuating force on either section or on both sections.

9. Tunable prism according to claim 6, wherein the prism-shaping device or the window is connected to at least one actuation means that is configured to generate an actuation force for tilting the window around the first and/or the second axis.

10. Tunable prism according to claim 9, wherein the prism-shaping device is connected to a movable part that connects the actuation means and the prism-shaping device.

11. Tunable prism according to claim 9, wherein the at least one actuation means comprises or is a voice coil actuator, the voice coil actuator comprising a magnetic portion and a voice coil portion.

12. Tunable prism according to claim 9, wherein the tunable prism comprises a driver circuit configured to control electric currents applied to the at least one actuation means.

13. Tunable prism according to claim 1, wherein the tunable prism comprises a gimbal, wherein the window, the prism-shaping device or the movable part is connected to the gimbal such that the window can be tilted around the first and/or the second axis with respect to the bottom portion.

14. Tunable prism according to claim 13, wherein the tunable prism comprises four voice coil actuators that are arranged pairwise opposite of each other, wherein the driver circuit comprises a first and a second channel (c1, c2), wherein the voice coil portions comprise double coils, wherein each channel (c1, c2) is configured and connected to one pair of the pairwise arranged voice coil actuators such that the respective channel (c1, c2) can provide the same electric current to the voice coil portions that are arranged opposite of each other, wherein each channel (c1, c2) is connected such to the double coils of the voice coil portion that the generated forces of the two opposite voice coil portions point in opposite directions, when the electric current is provided.

15. Imaging system comprising a tunable prism according to claim 1, the imaging system comprising an image sensor and an imaging optics configured to focus an image on the image sensor, wherein the tunable prism is arranged at the imaging optics, particularly in front of the imaging optics and arranged such that an angle of incident light can be altered by tilting the window of the tunable prism.

16. Tunable prism according to claim 1, wherein the window is planar, and the curvature of light traversing the window remains unaltered, such that any image distortion due to focusing or defocusing effects of the window is prevented.

17. Tunable prism according to claim 1, wherein the transparent window is a glass window or the tunable prism comprises a prism-shaping device, wherein the prism-shaping device is the transparent window and the prism shaping device is made of rigid polymer.

* * * * *